(12) United States Patent
Ohnishi et al.

(10) Patent No.: US 7,703,112 B2
(45) Date of Patent: Apr. 20, 2010

(54) IMAGE OUTPUT SYSTEM, IMAGE OUTPUT APPARATUS, INFORMATION PROCESSING APPARATUS AND PROGRAM

(75) Inventors: Rumi Ohnishi, Osaka (JP); Toru Sato, Osaka (JP); Masafumi Shimotashiro, Osaka (JP)

(73) Assignee: Panasonic Corporation, Osaka (JP)

( * ) Notice: Subject to any disclaimer, the term of this patent is extended or adjusted under 35 U.S.C. 154(b) by 319 days.

(21) Appl. No.: 11/643,789

(22) Filed: Dec. 22, 2006

(65) Prior Publication Data

US 2007/0150832 A1 Jun. 28, 2007

(30) Foreign Application Priority Data

Dec. 27, 2005 (JP) .............................. 2005-374467

(51) Int. Cl.
 *H04N 7/16* (2006.01)
(52) U.S. Cl. .............................. 725/28; 725/29; 725/30; 348/734
(58) Field of Classification Search .................... 725/28, 725/29, 30; 348/734
See application file for complete search history.

(56) References Cited

U.S. PATENT DOCUMENTS

| 6,037,969 | A * | 3/2000 | Lim et al. ...................... 725/28 |
| 6,359,661 | B1 * | 3/2002 | Nickum ....................... 348/734 |
| 7,194,755 | B1 * | 3/2007 | Nakata et al. ................. 725/78 |
| 2002/0059588 | A1 * | 5/2002 | Huber et al. .................. 725/35 |
| 2003/0154473 | A1 * | 8/2003 | Shin ............................. 725/28 |
| 2005/0005288 | A1 * | 1/2005 | Novak .......................... 725/32 |
| 2005/0166240 | A1 * | 7/2005 | Kim ............................. 725/78 |
| 2005/0251827 | A1 * | 11/2005 | Ellis et al. ..................... 725/47 |
| 2006/0031872 | A1 * | 2/2006 | Hsiao et al. ................... 725/28 |
| 2008/0282294 | A1 * | 11/2008 | Carpenter et al. ............. 725/58 |

FOREIGN PATENT DOCUMENTS

| JP | 2003-309882 A | 10/2003 |
| JP | 2004-153702 A | 5/2004 |

* cited by examiner

*Primary Examiner*—Christopher Kelley
*Assistant Examiner*—Mulugeta Mengesha
(74) *Attorney, Agent, or Firm*—McDermott Will & Emery LLP

(57) ABSTRACT

An image output system configured of information terminals, each of which includes an identification information storage unit which stores identification information for identifying each of the information terminals and a transmission unit which transmits the identification information, and an image output apparatus which includes: an identification information receiving unit which receives the identification information transmitted by each of the information terminals; an output unit which obtains image information which is information for outputting images, and outputs images based on the obtained image information; a judgment unit which judges whether or not plural pieces of identification received by the identification information receiving unit satisfy a predetermined condition; and an output control unit which controls the output unit based on the judgment made by the judgment unit.

11 Claims, 22 Drawing Sheets

FIG. 5

| ID | Name of Image Information | Condition Information | Reproduction Time (minute) | Reproduction Flag |
|---|---|---|---|---|
| 001 | movie 01 | TV-Y7 | 30 | 0 |
| 002 | movie 03 | TV-14 | 160 | 0 |
| 003 | movie 07 | TV-MA | 120 | 0 |
| ⋮ | ⋮ | ⋮ | ⋮ | ⋮ |

FIG. 6

| ID | Identification Information | Viewing Condition |
|---|---|---|
| 001 | 100112 | TV-Y7,TV-14,TV-MA |
| 002 | 184118 | TV-Y7 |
| 003 | 171344 | TV-Y7,TV-14 |
| ⋮ | ⋮ | ⋮ |

FIG. 10

| Number | Broadcast Station | Condition Information | Selection Flag |
|---|---|---|---|
| 1 | URL TV | TV-Y7 | 0 |
| 2 | WWW TV | TV-14 | 0 |
| 4 | RSS TV | TV-G | 1 |
| 6 | PPP TV | TV-G | 0 |
| 8 | SSL TV | TV-MA | 0 |
| 10 | FTP TV | TV-G | 0 |

FIG. 11

| ID | Identification Information | Age |
|---|---|---|
| 001 | 100112 | 34 |
| 002 | 184118 | 12 |

FIG. 12

| Condition Information | Minimum Age |
|---|---|
| TV-Y7 | 7 |
| TV-14 | 15 |
| TV-MA | 18 |
| TV-G | 0 |

| ID | Name of Image Information | Condition Information | Reproduction Time (minute) | Judgment Flag |
|---|---|---|---|---|
| 001 | movie 01 | TV-14 | 30 | 1 |
| 002 | movie 03 | TV-Y7 | 160 | 1 |
| 003 | movie 08 | TV-Y7 | 120 | 1 |
| 004 | movie 09 | TV-MA | 10 | 1 |
| 005 | movie 16 | TV-Y7 | 15 | 1 |

| ID | Name of Image Information | Condition Information | Reproduction Time (minute) | Judgment Flag |
|---|---|---|---|---|
| 001 | movie 01 | TV-14 | 30 | 0 |
| 002 | movie 03 | TV-Y7 | 160 | 1 |
| 003 | movie 08 | TV-Y7 | 120 | 1 |
| 004 | movie 09 | TV-MA | 10 | 0 |
| 005 | movie 16 | TV-Y7 | 15 | 1 |

IMAGE OUTPUT SYSTEM, IMAGE OUTPUT APPARATUS, INFORMATION PROCESSING APPARATUS AND PROGRAM

BACKGROUND OF THE INVENTION (1) Field of the Invention

The present invention relates to an image output system or the like for outputting contents including images, or the like.

(2) Description of the Related Art

Some conventional image output systems control viewable contents depending on the type of remote controlling apparatus, using an ID of a remote controlling apparatus, so as to limit the viewing of the contents (e.g., see reference to page 1, FIG. 1, Japanese Laid-Open Patent Application No. 2004-153702).

Also, other conventional image output systems control a connection between a remote controlling apparatus and home electrical appliances by performing authentication at the time of the connection using an ID of the remote controlling apparatus (e.g., see reference to page 1, FIG. 1, Japanese Laid-Open Patent Application No. 2003-309882).

SUMMARY OF THE INVENTION

However, for example, in the conventional image output systems, in the case where a user views a content in operating a remote controlling apparatus, another user, who has a remote controlling apparatus with which the content cannot be operated, can view the content provided that he/she is near the user who views the content, e.g., in the same room. Normally, the user who has a remote controlling apparatus which cannot operate a content is not permitted to view the content. It therefore follows that the conventional image output system allows viewing to the user who is not actually allowed to view the content.

Thus, the problem in the conventional technology is that it is not possible to thoroughly limit the viewing of content by plural users.

The present invention is conceived in view of the above problem, and an object of the present invention is to provide an image output system capable of thoroughly limiting content viewing and outputting contents to the users who are present within a range in which the identification information transmitted from plural information terminals can be received by the image output apparatus.

The image output system according to the present invention includes information terminals and an image output apparatus, each of the information terminals including: an identification information storage unit which stores identification information for identifying each of the information terminals; and a transmission unit which transmits the identification information to the image output apparatus. The image output apparatus includes: an identification information receiving unit which receives the identification information transmitted from each of the information terminals; an output unit which obtains image information which is information related to an image, and to output the obtained image information; a condition information obtainment unit which obtains condition information which is related to a predetermined condition associated with the image information outputted by the output unit; a judgment unit which judges whether or not each piece of identification information received by the identification information receiving unit satisfies the predetermined condition which is set in the condition information obtained by the condition information obtainment unit; and an output control unit which controls the output unit based on the judgment made by the judgment unit.

According to the configuration as described above, it is possible to thoroughly limit viewing of a content by plural users. Also, the content can be outputted when a condition for the output is satisfied by the plural users present within a range in which identification information can be transmitted to the image output apparatus.

In the image output system according to the present invention, the output control unit may control the output unit to switch image information to other image information or to stop the output of the image information which is currently outputted by the output unit, based on the judgment made by the judgment unit.

With the configuration as described above, it is possible to provide the user with image information alternative to the image information for which viewing is limited and which is currently being outputted. Also, it is possible to allow the user to clearly recognize that the viewing is limited for the currently-outputted image information.

In the image output system of the present invention, the image output apparatus may further include an output instruction receiving unit which receives information for instructing on the output of the image information, and the output control unit may control the output unit to output the image information based on the judgment made by said judgment unit.

According to the above-mentioned technical feature, it is possible to limit the output of the image information which the user attempts to view, for example, by not allowing the output of such image information based on the users.

In the image output system of the present invention, the output unit may output the image information to one or more windows, and the output control unit may control the windows to which said output unit outputs the image information, based on the judgment made by the judgment unit.

With such a technical feature as described above, it is possible to limit viewing by changing, based on the users, the number of windows onto which the image information is to be outputted.

In the image output system according to the present invention, the output unit may output a list made up of one or more listed items, each of which is associated with the image information that can be outputted by the output unit, The judgment unit may judge, for each piece of image information that can be outputted by the output unit, whether or not each piece of identification information satisfies the predetermined condition which is a condition for outputting each piece of image information, and the output control unit may control the output unit to output a listed item in a manner different from a manner in which a listed item is outputted, the former listed item being associated with the image information to be outputted based on each piece of identification information which is judged as satisfying the predetermined condition, and the latter listed item being associated with other image information.

With the above-mentioned technical feature, it is possible to inform, based on the users, the user of whether or not content is viewable by displaying a list of contents for which viewing is limited and a list of contents for which viewing is not limited in different modes.

In the image output system of the present invention, the judgment unit may judge whether or not plural pieces of pre-set identification information match the plural pieces of identification information received by the identification information receiving unit.

With the technical feature as described above, it is possible to determine whether or not to impose limitation on the output of the image information depending on whether or not the users are all present.

In the image output system according to the present invention, the judgment unit may judge whether or not all the pieces of identification information received by the identification information receiving unit satisfy the predetermined condition.

According to such a technical feature, it is possible to output the image information with limitation imposed, in the case where one of the users is not allowed to view the image information without limitation.

The image output apparatus according to the present invention includes: an identification information receiving unit which receives identification information respectively transmitted from information terminals, the identification information identifying each of the information terminals; an output unit which obtains image information which is information related to an image, and to output the obtained image information; a condition information obtainment unit which obtains condition information which is information related to a predetermined condition associated with the image information outputted by the output unit; a judgment unit which judges whether or not each piece of identification information received by the identification information receiving unit satisfies a predetermined condition which is set in the condition information obtained by the condition information obtainment unit; and an output control unit which controls the output unit based on the judgment made by the judgment unit.

With the technical feature as mentioned above, it is possible to thoroughly limit the viewing of the content by plural users in the image output apparatus of the present invention.

The image processing apparatus according to the present invention includes: an identification information receiving unit which receives identification information respectively transmitted from information terminals, the identification information identifying each of the information terminals; a condition information receiving unit which receives condition information which is information related to a predetermined condition associated with image information; a judgment unit which judges whether or not each piece of identification information received by the identification information receiving unit satisfies the predetermined condition set in the condition information received by the condition information receiving unit; and a judgment information transmission unit which transmits, to an image output apparatus, judgment information indicating the judgment made by the judgment unit.

According to the image output system of the present invention, it is possible to thoroughly limit content viewing by plural users. Also, it is possible to output content for which viewing is allowed for the persons present within a range in which identification information can be transmitted to the information processing apparatus. In addition, setting and modification of the range of receiving the identification information can be adjusted by moving the information processing apparatus from one place to the other, which renders the setting of the image output system simple. Moreover, the necessity for changing the position of the image output apparatus becomes lower since the range for the reception of the identification information is adjusted, which allows the flexibility in placing the image output apparatus. Furthermore, it is possible to thoroughly limit content viewing by plural users as well as to set a predetermined condition to be used in the limitation on the viewing in the condition information.

With the image output system according to the present invention, it is possible to thoroughly limit content viewing by plural users.

FURTHER INFORMATION ABOUT TECHNICAL BACKGROUND TO THIS APPLICATION

The disclosure of Japanese Patent Application No. 2005-374467 filed on Dec. 27, 2005 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 5 is a diagram showing an image information management table according to the first embodiment;

FIG. 6 is a diagram showing an identification information management table according to the first embodiment;

FIG. 10 is a diagram showing a channel management table according to the second embodiment;

FIG. 11 is a diagram showing the identification information management table according to the second embodiment;

FIG. 12 is a diagram showing a condition information management table according to the second embodiment;

DESCRIPTION OF THE PREFERRED EMBODIMENT(S)

The following describes the embodiments of an image output system or the like, with reference to the drawings. Note that the components provided with the same numerical references throughout the embodiments operate in the same manner, and the descriptions may not be repeated.

First Embodiment

Figure 1:
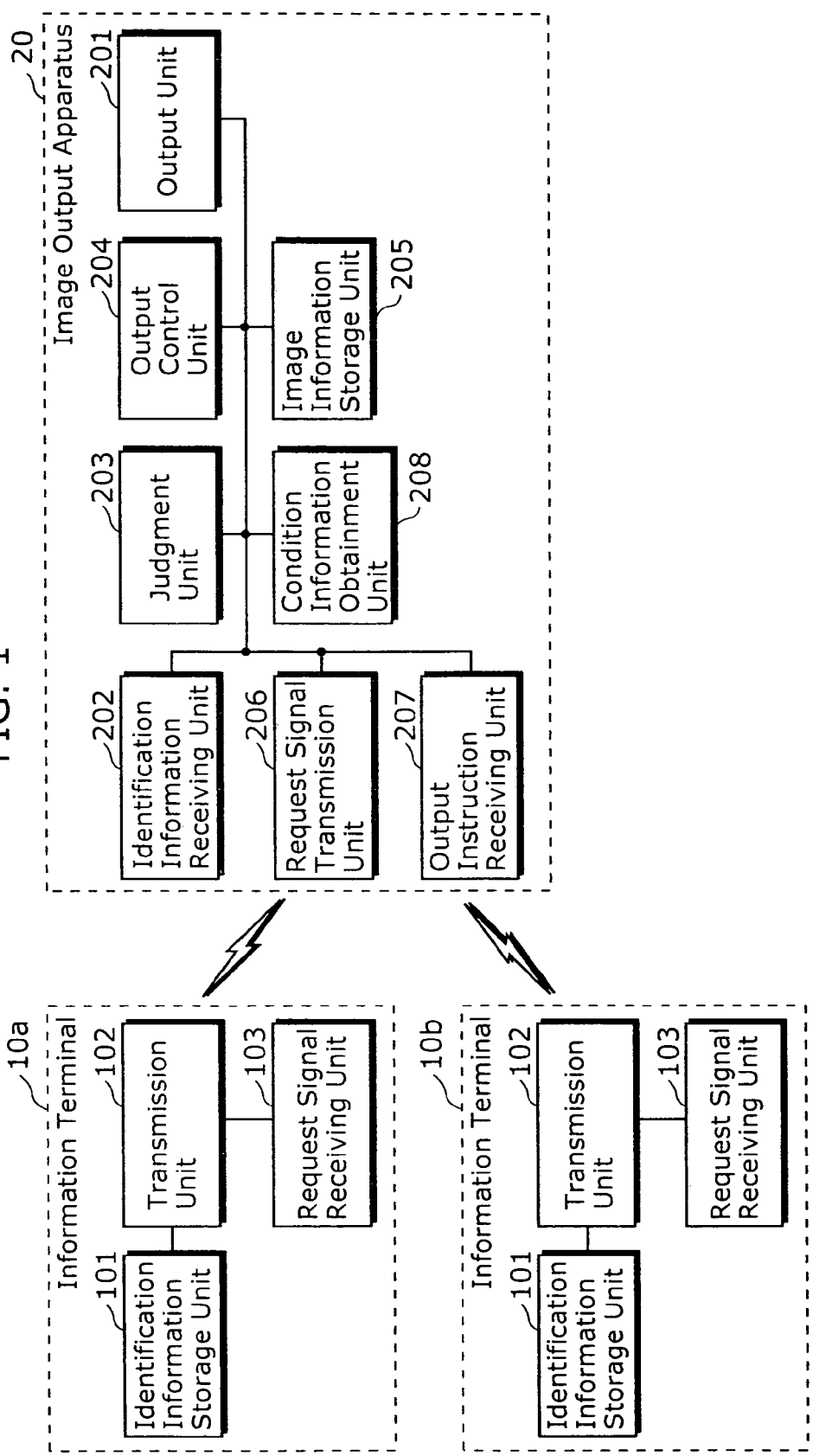
FIG. 1 is a block diagram showing an image output system according to a first embodiment.

FIG. 1 is a block diagram showing the image output system according to the present embodiment.

The image output system is configured of information terminals 10a and 10b, and an image output apparatus 20. Note that this embodiment describes the case where two information terminals are utilized. The present invention is applicable even to the case where plural information terminals having the same configuration as the configurations of the information terminals 10a and 10b.

The information terminal 10a includes an identification information storage unit 101, a transmission unit 102 and a request signal receiving unit 103. The information terminal 10a transmits identification information which is information to be used by the image output apparatus 20 for identifying the information terminal 10a among other information terminals. The information terminal 10a can be realized, for example, with a remote controlling apparatus (hereinafter to be referred to as "remote controller") having a configuration for the transmission of the identification information, a PDA, a mobile phone, a mobile phone or an RFID tag having the same function as that of the remote controller, and the like. It is preferable that the information terminal 10a is portable by the user. Note that the description shall be omitted here, but in the case where the information terminal 10a is a remote controller or a mobile phone or the like, it is assumed that the information terminal 10a is equipped with a configuration for remote controlling other devices, a configuration for making calls and the like.

The identification information storage unit 101 may store identification information for identifying the information terminal 10a. The data structure of the identification information is not to be questioned here. More precisely, the identification information may be of any kind if it can identify the information terminal 10a. For example, the identification information can be an ID made up of a name and a phone number of the information terminal 10a, a character string unique to the information terminal 10a, and others. The identification information does not need to uniquely identify the information terminal 10a. In other words, an information terminal, in which the same identification information as that of the information terminal 10a is stored, may be included as a part of the system. For example, the identification information may be characters and symbols for representing authorization, limitation and others provided for the information terminal 10a. To be concrete, the identification information may be information related to the character string to be used or displayed for limiting content viewing, for example, information related to the character string such as TV-Y7 and PG-12 used for parent control and rating specification of the contents, and the like, and the information about the age and age zones of the user who holds the information terminal 10a. The identification information may also be information related to the character string which specifies a group or the like to which the user holding the information terminal 10a belongs, or information to be a release key to be used for decrypting an encrypted content, or information such as a password necessary for viewing a content for which viewing is limited by the password. Also, the identification information may be the information made up of the name of a maker, a manufacture's symbol, a serial number or the combination thereof. Moreover, the identification information may function also as a signal for controlling the image output apparatus 20. The identification information storage unit 101 is preferable to be non-volatile storage medium, but may be volatile.

The transmission unit 102 transmits the identification information stored in the identification information storage unit 101. A trigger or a timing by or at which the transmission unit 102 transmits the identification information stored in the identification information storage unit 101 is not to be questioned here. For example, the transmission unit 102 may transmit the identification information regularly or irregularly, or may transmit the identification information as triggered by the fact that a receiving unit or the like, though not shown in the diagram, receives a user's instruction to transmit the identification information. Note that the example shows the case where the transmission unit 102 transmits the identification information when the request signal receiving unit 103, which is to be mentioned later, receives a request signal that is a signal for requesting for transmission of the identification information transmitted from the image output apparatus 20. For example, when the information terminal 10a is an RFID tag, it is possible for the transmission unit 102 to transmit the identification information using the electric power provided by the request signal transmitted from the image output apparatus 20 or other apparatus. The transmission of the transmission unit 102 may be performed through a communication via a network such as a wireless or wired LAN or the like, or through a local wireless communication such as Bluetooth (registered mark), or through an infrared communication. The transmission unit 102 is normally realized with a wireless or wired communication unit, but may be realized with a broadcasting unit.

The request signal receiving unit 103 receives a request signal that is a signal for requesting for the transmission of the identification information. The request signal may be received through the communication via a network such as a wireless or wired LAN or the like, or through a local wireless communication such as Bluetooth (registered mark). Normally, the request signal receiving unit 103 is realized with a wireless or wired communication means, but may be realized with a broadcasting means.

The detailed description of the information terminal 10b is not to be repeated here since its configuration is the same as the configuration of the information terminal 10a, except that the identification information storable in the identification information storage unit 101 is information to be used by the image output apparatus 20 for identifying the identification terminal 10b among other information terminals, unlike the identification information which may be stored in the identification information storage unit 101 of the information terminal 10a.

The image output apparatus 20 is configured of an output unit 201, an identification information receiving unit 202, a judgment unit 203, an output control unit 204, an image information storage unit 205, a request signal transmission unit 206, an output instruction receiving unit 207 and a condition information obtainment unit 208. The image output apparatus 20 is an apparatus that can output images via televisions, video players and personal computers.

The output unit 201 obtains image information which is information related to images, and outputs the obtained image information. The embodiment describes the case in which the output unit 201 obtains the image information by reading the image information stored in the image information storage unit 205, and outputs the obtained image information, but how the output unit 201 obtains the image information is not to be questioned. For example, an image receiving unit (not shown in the diagram) which is a unit that externally receives images from a tuner or the like may be equipped in the output unit 201 so that the output unit 201 may obtain the image information received by the image receiving unit or the image information stored in a hard disk or the like. The output unit 201 may obtain the image information transmitted through streaming via a network such as the Internet or the like.

Moreover, the image information obtained by the output unit 201 may be information related to moving pictures or information related to still pictures such as those formatted in JPEG or TIFF format. The image information may be analog or digital. The scheme or file format of the image information outputted by the output unit 201 is not to be questioned here. The image information outputted by the output unit 201 may be bitmap information or vector information. The image information may be coded, and the coding method such as MPEG-2 and MPEG-4 is not to be questioned. In the case where the image information is coded information, the output unit 201 may output the image information by decoding as needed. The image information mentioned here may be stored in a hard disk, a video tape or the like, or received via a predetermined channel as a wired or wireless broadcast, and it does not matter what the source is. The output unit 201 may output altogether plural image information.

The output unit 201 may output plural windows for outputting one or more pieces of image information at one time, and output the image information within respective windows. Thus, a technology of outputting plural image information and windows at one time is known, and the description will be omitted. The output of the image information by the output unit 201 is controlled by the output control unit 204. The output control carried out by the output unit 201 includes stopping the output of the image information that is currently being outputted, changing a display method of the image which is currently being outputted, for instance, by changing the resolution of such image information, e.g., switching the image information that is currently being outputted to another image information including pre-set image information, and stopping the output of the image information attempted by the output unit 201. In the case where the output unit 201 is to output image information onto one or more windows, the output control of the output unit 201 may be closing the one or more windows through which the image information is currently being outputted, or stopping the output of the window that is set for output usage, or newly opening a window intended for output, or changing the output size of a predetermined window, or the like.

In the case where conditional access is set through coding or the like, the conditional access shall be released, under the control of the output control unit 204, using a decryption key and a password which are either previously stored in a memory (not shown in the diagram) or provided from outside. The output unit 201 may or may not include an output device such as a display. Also, the output unit 201 can be realized with a driver soft of a display or with a driver soft of an output device, or the like. The output is a concept which includes an image display based on image information, printing onto a printer and a transmission to an external apparatus.

The identification information receiving unit 202 receives the identification information transmitted from the information terminals 10a and 10b. Note here that the example shows the case of using two information terminals; however, in the case of using three or more information terminals, the identification information receiving unit 202 only needs to receive the identification information of the respective information terminals. The identification information receiving unit 202 may store the received identification information into a memory (not shown in the diagram) or the like. The identification information receiving unit 202 may manage the identification information stored in a memory or the like. For example, in the case of receiving the same identification information as the identification information stored in a memory or the like, the identification information receiving unit 202 may update the stored identification information with the lastly-received identification information. The identification information receiving unit 202 may also judge whether or not a predetermined time has passed after the storage of the identification information, and may delete the identification information which has been stored for the predetermined time from a memory or the like. The identification information may be received through the communication via a network such as a wireless or wired LAN or through a local wireless communication such as Bluetooth (registered trade mark) or through an infrared communication. The identification information receiving unit 202 is normally realized with a wireless or wired communication unit, but it may be realized with a broadcast receiving unit.

The judgment unit 203 judges whether or not the plural identification information received by the identification information receiving unit 202 satisfies a predetermined condition. More precisely, the "predetermined condition" is a condition used for judging whether or not a predetermined control should be performed to the output of the output unit 201. For example, the "predetermined condition" may be a condition for judging the control on whether to continue outputting the image information being outputted by the output unit 201 or to stop the output, or a condition for judging the control on whether or not to output, from the output unit 201, the image information for which an output instruction is received by a receiving unit not shown in the diagram. Alternatively, it may be a condition for judging the control on whether or not to switch the image information being outputted from the output unit 201 to different image information, or a condition for judging the control on whether or not to switch the image information being outputted by the output unit 201 to different image information by switching a channel via which the output unit 201 outputs the image information to another channel, or a condition for judging the control on whether or not to newly open one or more windows for image display, or a condition for judging the control on whether or not to close the window on which the image information is being outputted.

Here, in the case where the identification information is represented by a numerical value or associated with a numerical value, the "predetermined condition" may be a condition indicating that "all of the values of plural identification information or the values obtained from the plural identification information respectively indicate a predetermined value or greater". Alternatively, the condition may indicate that "all the identification information corresponds to each other", or "all the identification information received by the identification information receiving unit 202 corresponds to at least one of the identification information in a list of pre-stored identification information" or "at least one of the plural identification information received by the identification information receiving unit 202 corresponds to one of the identification information in the list of identification information stored in a memory (not shown in the diagram) or the like", or "the plural identification information received by the identification information receiving unit 202 corresponds to none of the identification information in the list of identification information". The condition may indicate that "all of the plural pieces of identification information correspond to the identification information previously stored in a memory (not shown in the diagram) or the like", or "all of the plural pieces of identification information do not correspond to the identification information previously stored in a memory (not shown in the diagram)" or the like.

Note that the correspondence here may signify partial correspondence or perfect correspondence. The "predetermined condition" may be previously stored in a storage medium such as a memory, or may be stored in the image information storage unit 205, for instance, in association with the image information which the output unit 201 is currently outputting or attempts to output.

The "predetermined condition" may be embedded into or added to image information and channel information. Here, the example will be given for the case where the judgment unit 203 judges whether or not the plural identification information received by the identification information receiving unit 202 satisfies a predetermined condition which is set in the condition information obtained by the condition information obtainment unit 208. The condition "whether or not a predetermined condition is satisfied" may be "whether or not a predetermined condition is not satisfied". The judgment unit 203 may make the judgment by any trigger or at any timing. For example, the judgment unit 203 may make the judgment regularly or irregularly or in the case where the identification information receiving unit 202 receives new identification information.

The judgment unit 203 reads such "predetermined condition" when the judgment process is required, for example. The judgment unit 203 can be normally realized with an MPU, a memory or the like. The procedure of the judgment unit 203 is normally realized with software and the software is stored in a storage medium such as a ROM. However, the judgment unit 203 may be realized with hardware (dedicated communication circuit).

The output control unit 204 controls the output unit 201 based on the result of the judgment made by the judgment unit 203. More precisely, the output control unit 204 performs control in order to limit the output of the output unit 201. The output control unit 204 "controls the output unit 201 based on the result of the judgment" to perform control that is previously set according to the result of the judgment. For example, the judgment that can be obtained by the judgment unit 203 and the information which defines the control to be performed may be previously stored in association with each other into a storage medium such as a memory, so that the information which defines the control to be performed and is associated with the judgment obtained by the judgment unit 203 is obtained from among the stored information. Note that the phrase "controls the output unit 201 based on the result of the judgment" is a concept which includes not controlling the output unit 201 based on the judgment.

Here, "limiting an output" means, for instance, stopping an output, changing the quality of an output, and performing mosaic processing onto an image to be outputted. For example, the output control unit 204 performs control to stop an output of the image information that is being outputted by the output unit 201, based on the judgment. Also, the output control unit 204 may perform control to output or not to output the image information for which an output instruction is received by a receiving unit or the like, based on the judgment. The output control unit 204 may perform control to switch the channel which is being outputted by the output unit 201 to another channel so as to switch the image information that is being outputted by the output unit 201 to different image information. Also, the output control unit 204 may perform control to open one or more new windows for displaying images or to close the window which is being used for output. The output control unit 204 can be normally realized with an MPU, a memory or the like. The procedure of the output control unit 204 is normally realized with software and the software is stored in a storage medium such as a ROM. However, the output control unit 204 may be realized with hardware (dedicated communication circuit).

The image information storage unit 205 may store one or more pieces of image information outputted by the output unit 201. The image information to be stored in the image information storage unit 205 may be information related to moving pictures, information related to still pictures in JPE or TIFF format. Such image information may be either analog or digital. The scheme or file format of the image information to be stored in the image information storage unit 205 is not to be questioned here. The image information to be stored in the image information storage unit 205 may be bitmap information or vector information or coded information. It is preferable to realize the image information storage unit 205 with a non-volatile storage medium, but the image information storage unit 205 can be realized with a volatile storage medium.

The request signal transmission unit 206, which transmits a request signal, may transmit a request signal by any trigger or at any timing. For example, a request signal may be transmitted regularly or irregularly, or at the time when the power of the image output apparatus 20 is turned on, or immediately before the output unit 201 outputs the image information. The request signal is previously stored in a storage medium such as a memory. The transmission of the request signal may be performed through the communication via a network such as a wireless or wired LAN, or may be performed through a local wireless communication such as Bluetooth, or through an infrared communication. The request signal transmission unit 206 is normally realized with a wireless or wired communication unit, but may be realized with a broadcasting unit.

The output instruction receiving unit 207 receives an output instruction which is an instruction to specify an image to be outputted by the output unit 201. For example, the output instruction receiving unit 207 receives an output instruction to output one of the image information stored in the image information storage unit 205. Alternatively, the output instruction receiving unit 207 selects one of the channels that can be received by a receiving unit not shown in the diagram, and receives an output instruction to output the image information received via the selected channel. It may be defined that a storage unit or the like which is not shown in the diagram stores in advance, into a memory or the like, the information for specifying the channel via which the image information is being outputted when the power is turned off or the image information which is being outputted when the power is turned off, so that the output instruction receiving unit 207 receives an output instruction to output the image information specified by information such as the image information read-out from the memory or the like, and the information for specifying the channel. The output unit 201 obtains the image information associated with the output instruction received by the output instruction receiving unit 207, and outputs images based on the image information. The input received by the output instruction receiving unit 207 may be an input via numeric keypads, a keyboard, a mouse and a menu screen, and an input unit may be of any kinds. The output instruction receiving unit 207 can be realized with a device driver of an input unit such as numeric keypads, a keyboard and the like, or software for controlling a menu screen, or the like.

The condition information obtainment unit 208 obtains condition information which is information related to the predetermined condition as described above and is associated with the image information outputted by the output unit 201. To be more concrete, the condition information is the information for setting a predetermined condition to be used for the judgment by the judgment unit 203. The condition information may be information for setting all of predetermined conditions, or part of predetermined conditions, e.g., parameters of predetermined conditions, or information associated with predetermined conditions. For example, in the case where condition information is included in the image information, the condition information obtainment unit 208 obtains the condition information from the image information. In the case where the condition information is stored in a storage medium such as a memory in association with the image information, the condition information obtainment unit 208 obtains the image information from a storage medium such as a memory. The condition information obtainment unit 208 may obtain the condition information from the information such as SI information which is a source to output an electronic TV program. The condition information obtainment unit 208 can be normally realized with an MPU, a memory or the like. The procedure of the condition information obtainment unit 208 is normally realized with software and the software is stored in a storage medium such as a ROM. However, the condition information obtainment unit 208 may also be realized with hardware (dedicated communication circuit).

Next, the operation of the information terminal 10a will be described with reference to the flowchart shown in FIG. 2. Note that the operation of the information terminal 10b is as same as the operation of the information terminal 10a, and the descriptions shall be omitted.

(Step S201) The request signal receiving unit 103 judges whether or not a request signal has been received. In the case where a request signal has been received, the process moves to Step S202, and in the case where a request signal has not been received, the process returns back to Step S201.

(Step S202) The transmission unit 102 obtains the identification information stored in the identification information storage unit 101.

(Step S203) The transmission unit 102 transmits the identification information obtained in Step S202. The process returns to Step S201.

Note that in the case where the information terminal 10a is an apparatus that transmits identification information upon the reception of the request signal, as in the case of RFID tag, the judgment process as shown in Step S201 may be omitted.

In the case where the information terminal 10a is a remote controller or the like, and receives an instruction to transmit a remote control signal by pressing a key or the like instead of performing the above-mentioned operation, the transmission unit 102 may transmit identification information paired with a remote control signal.

Figure 2:
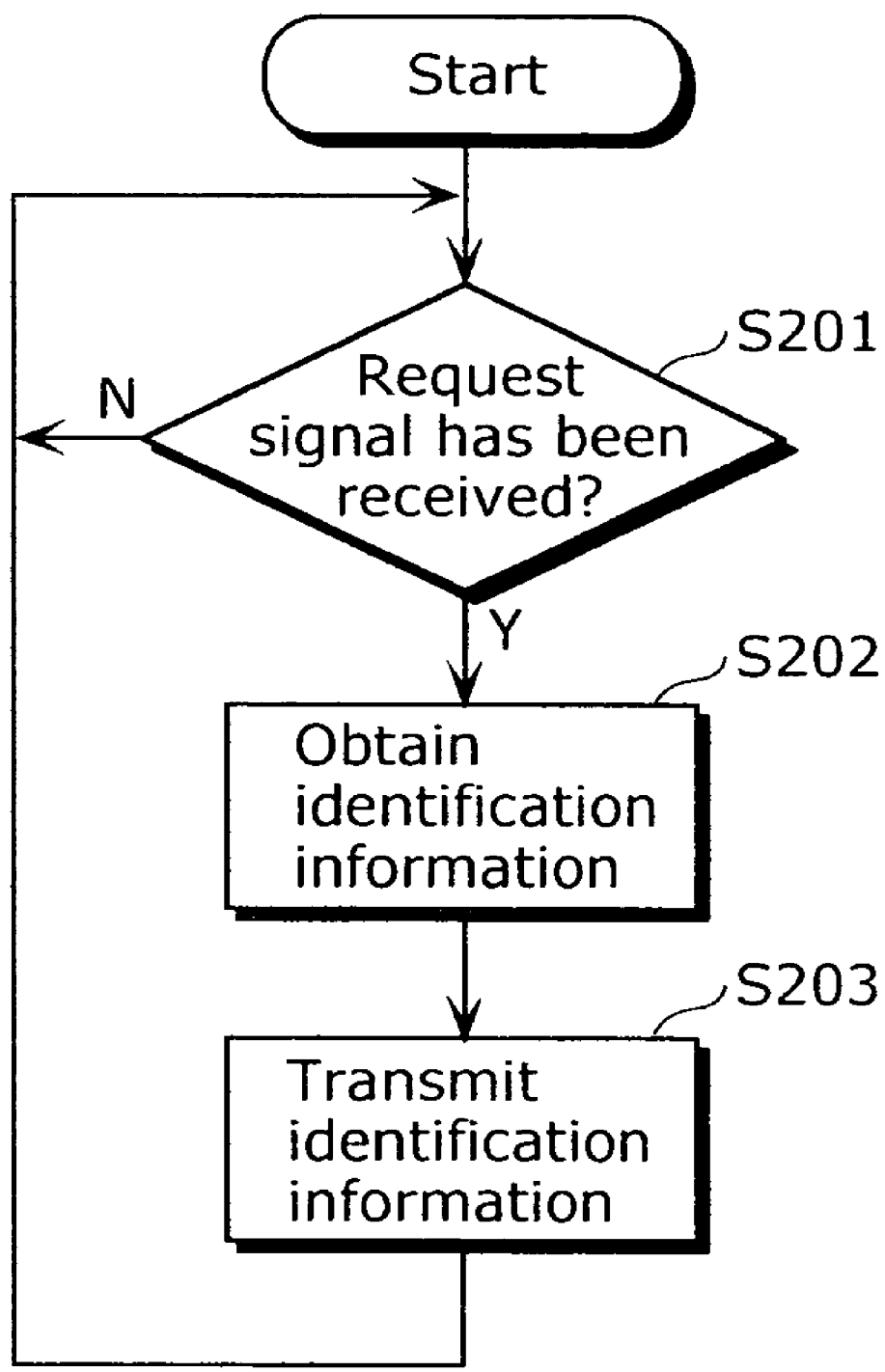
FIG. 2 is a flowchart illustrating the operation of an information terminal according to the first embodiment.

Note that, in the flowchart shown in FIG. 2, the process terminates the interruption caused by the fact the power is turned off or the process is terminated.

Figure 3:
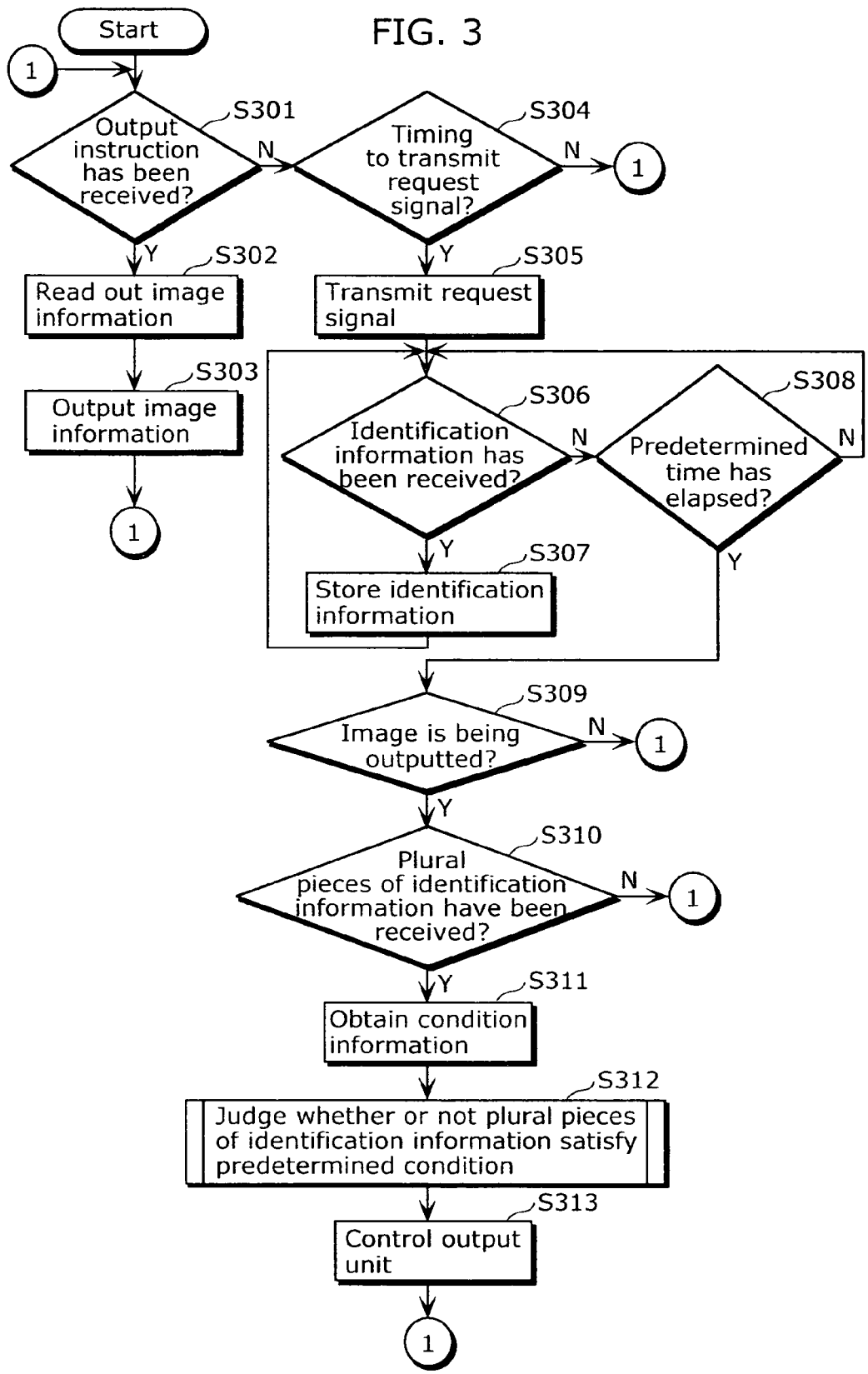
FIG. 3 is a flowchart illustrating the operation of an image output apparatus according to the first embodiment.

Next, the operation of the image output apparatus 20 shall be described using the flowchart in FIG. 3.

(Step S301) The output instruction receiving unit 207 judges whether or not an output instruction has been received. In the case where an output instruction has been received, the process moves to Step S302, and in the case where an output instruction has not been received, the process moves to Step S304. Note that in Step S301 immediately after the power is turned on, the image information which is stored in a memory or the like and has been displayed when the power is turned off, and an output instruction to output default image information may be received.

(Step S302) The output unit 201 reads out, from the image information storage unit 205, the image information specified in the output instruction received in Step S301.

(Step S303) The output unit 201 outputs the image information read out in Step S302. The process returns to Step S301.

(Step S304) The request signal transmission unit 206 judges whether or not it is a timing to transmit a request signal. For example, this timing may be previously set to be regular or irregular, or at random. The request signal transmission unit 206 may judge that it is a timing to transmit, immediately after the image to be outputted by the output unit 201 is changed, or the like. In the case it is the timing to transmit the request signal, the process moves to Step S305, and it the case it is not, the process returns back to Step S301.

(Step S305) The request signal transmission unit 206 transmits a request signal.

(Step S306) The identification information receiving unit 202 judges whether or not identification information has been received. In the case where identification information has been received, the process moves to Step S307, and in the case where identification information has not been received, the process moves to Step S308.

(Step S307) The identification information receiving unit 202 stores the identification information received in Step S306 into a storage medium such as a memory. Note that the storage may be temporary. Then, the process goes back to Step S306.

(Step S308) The identification information receiving unit 202 judges whether or not a predetermined time has passed after the request signal transmission unit 206 transmitted a request signal. The predetermined time is set based, for example, on a processing speed of an information terminal, the number of information terminals, and a timing at which an information terminal transmits identification information. In the case where the predetermined time has elapsed, the process moves to Step S309, and in the case where the predetermined has not elapsed, the process returns back to Step S306.

(Step S309) The judgment unit 203 judges whether or not the output unit 201 is outputting images. In the case where the output unit 201 is outputting images, the process moves to Step S310, and in the case where the output unit 201 is not outputting images, the process returns back to Step S301.

(Step S310) The judgment unit 203 judges whether or not the identification information receiving unit 202 has received plural pieces of identification information. For example, the judgment unit 203 can count the number of the identification information stored in the memory or the like, and judge whether or not the number of the received identification information is plural based on a reception history of the identification information received by the identification information receiving unit 202. In the case of having received plural pieces of identification information, the process moves to Step S311, and in the case of not having received plural pieces of identification information, the process returns back to Step S301.

(Step S311) The condition information obtainment unit 208 obtains the condition information associated with the image information outputted from the output unit 201, especially the image information being outputted by the output unit 201. For example, the condition information obtainment unit 208 obtains the condition information added to the image information. Also, the condition information obtainment unit 208 may obtain the condition information associated with the channel being outputted by the output unit 201. Note that in the case where a predetermined condition associated with image information is not necessary, this step can be omitted.

(Step S312) The judgment unit 203 judges whether or not the plural pieces of identification information stored in Step S307 satisfy the predetermined condition which is set in the condition information obtained in Step S311. A concrete example of this process shall be mentioned later.

(Step S313) The output control unit 204 controls the output of the output unit 201 based on the judgment made by the judgment unit 203 in Step S312. The control performed by the output control unit 204 is control such as a control of switching the image information to be outputted, for instance. The kind of control to be performed by the output control unit 204 may be previously set in a memory. Also, the information for setting the kind of control to be performed by the output control unit 204 in accordance with the judgment may be added to the image information that is being outputted by the output unit 201, so that the output control unit 204 reads out the information according to the judgment, and controls the output unit 201 based on the information. Note that the output control unit 204 does not need to change the output depending on the result of the judgment. Then, the process returns back to Step S301.

Note that in the case where the image output apparatus 20 does not transmit a request signal, the process performed in Steps S304 and S305 may be omitted.

Note that, in the flowchart shown in FIG. 3, the process terminates by the interruption caused by the fact the power is turned off or the process is terminated.

Figure 4:
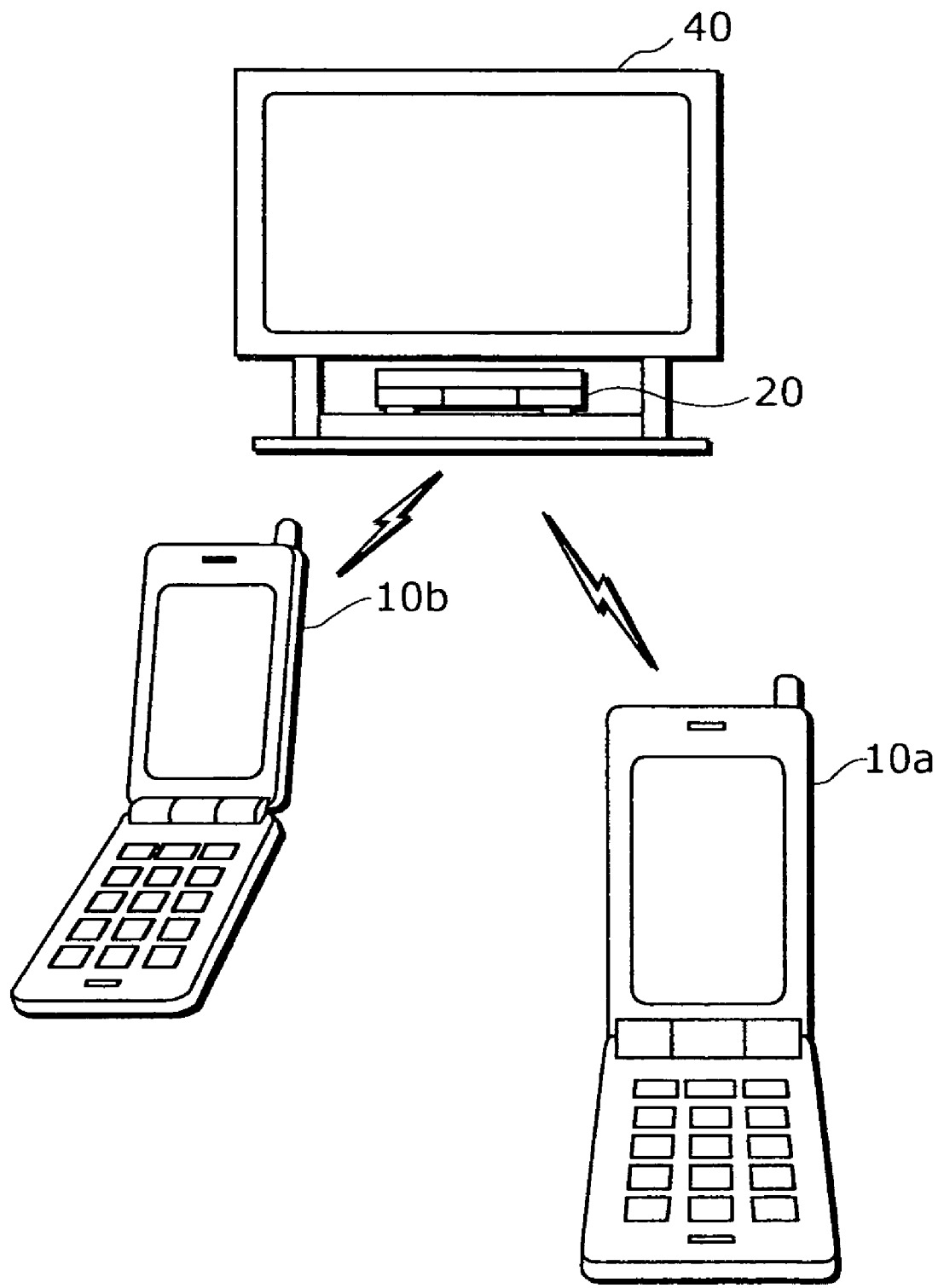
FIG. 4 is a conceptual diagram showing the image output system according to the first embodiment.

The following describes a concrete operation of the image output system according to the embodiment. FIG. 4 shows a conceptual diagram of the image output system. Note that in FIG. 4, the information terminals 10a and 10b are mobile phones which function as remote controllers, and the image output apparatus 20 is what is called a hard disk player which can output the image information stored in a hard disk and shall be connected to a display 40 which is an output device. The transmission of the request signal and the transmission of the identification information between the information terminals 10a and 10b and the image output apparatus 20 shall be performed wirelessly using electric waves. When receiving an instruction corresponding to each key, the information terminals 10a and 10b respectively transmit an output instruction which corresponds to the instruction directed to each key to the image output apparatus 20 through infrared communication. The output instruction receiving unit 207 shall receive such output instructions transmitted from the information terminals 10a and 10b. Note that the example here shows the case where the information terminals 10a and 10b can operate the image output apparatus 20, but such an operational function may not be equipped in the information terminals 10a and 10b.

The identification information storage unit 101 of the information terminal 10a stores identification information "100112" while the identification information storage unit 101 of the information terminal 10b stores identification information "184118".

FIG. 5 is a diagram showing an image information management table for managing the image information stored in the image information storage unit 205 of the image output apparatus 20. The image information management table has attributes such as "ID", "name of image information", "condition information", "reproduction time" and "reproduction flag". "ID" is information for managing image information. "name of image information" indicates the name of image information. "condition information" is condition information obtained by the condition information obtainment unit 208, and is a condition for setting a viewer who can view image information, that is, information indicating what is called "viewing condition".

Here, "condition information" may be previously embedded in or added to image information. The user may set it as needed. With regard to the condition information, "TV-Y7" indicates that image information targets the users at the age of 7 or above, "TV-Y14" indicates that the image information targets the users at the age of 15 or above, and "TV-MA" indicates that the image information targets the users at the age of 18 or above. "reproduction time" is information indicating the time required for the reproduction of the image information. "reproduction flag" is information indicating the image information that is currently being outputted. Here, the "reproduction flag" of the image information for which the output has been started shall be set to "1" and the "reproduction flag" of other image information shall be set to "0" by the output unit 201 or the like.

Firstly, it is assumed that only a user holding the information terminal 10a is in the room in which the image output apparatus 20 is placed.

The user holding the information terminal 10a turns on the power of the image output apparatus 20, presses a key or the like of the information terminal 10a, and transmits an output instruction for the output of the image information "movie 03" as shown in FIG. 5.

When the output instruction receiving unit 207 of the image output apparatus 20 receives an output instruction from the information terminal 10a, the output unit 201 reads and outputs the image information "movie 03" from the image information storage unit 205. The display 40 displays images based on the image information "movie 03". In the image information management table shown in FIG. 5, the attribute "reproduction flag" of the record including an attribute value of "movie 03" is set to "1".

The request signal transmission unit 206, as an example, regularly transmits a request signal, and it is assumed that the output for transmitting the request signal is adjusted so that the range of receiving the request signal is limited to the room in which the image output apparatus 20 is placed.

The information terminal 10a having received a request signal transmits the identification information "100112" stored in the identification information storage unit 101 according to the request signal.

The image output apparatus 20 having received the identification information transmitted by the information terminal 10a performs no other processing to the output of the out unit 201 since the only identification information received is the identification information transmitted from the information terminal 10a.

Needless to say, judging may be performed, using the conventional technology, on whether or not to continue the output of the image information for which the output unit 201 has received an output instruction or the image information that is being outputted, based on the identification information "100112" uniquely assigned to the user in the room.

Here, it is assumed that the user holding the information terminal 10b has entered the room in which the image output apparatus 20 is placed.

Assuming that the request signal transmission unit 206 has transmitted a request signal to be regularly transmitted, the information terminal 10a which has received the request signal transmits the identification information "100112" as described above. In addition, the information terminal 10b, having received the request signal, transmits the identification information "184118" stored in the identification information storage unit 101, according to the received request signal.

The image output apparatus 20, having received plural (here, two) identification information transmitted from the information terminals 10a and 10b, the condition information obtainment unit 208 obtains an attribute value "TV-14" of "condition information of the image information which is currently being outputted", that is, the record for which "1" is set as an attribute value of "reproduction flag" in the image information management table shown in FIG. 5. Then, the judgment unit 203 judges whether or not all of the identification information received by the identification information receiving unit 202 satisfy the predetermined condition set in the condition information "TV-14".

FIG. 6 is an identification information management table for managing the identification information of the information terminals 10a and 10b. The identification information management table is previously stored in a storage medium such as a memory which is not shown in the diagram. The identification information management table has attributes such as "ID", "identification information", and "viewing condition". "ID" is information for managing identification information. "identification information" is identification information stored in each of the information terminals. "viewing condition" is condition information which permits output (viewing in this case) of each identification information. The condition information corresponds to the attribute value which may be indicated as "condition information" in the image information management table described above. The "viewing condition" here shall be set by a manager of the image output apparatus 20, for example.

To be precise, the judgment unit 203 sets a predetermined condition of "viewing condition" which corresponds to identification information includes a condition which corresponds to the condition information "TV-14" obtained by the condition information obtainment unit 208", and judges whether or not all the identification information received by the identification information receiving unit 202 satisfy the predetermined condition.

Figure 7:
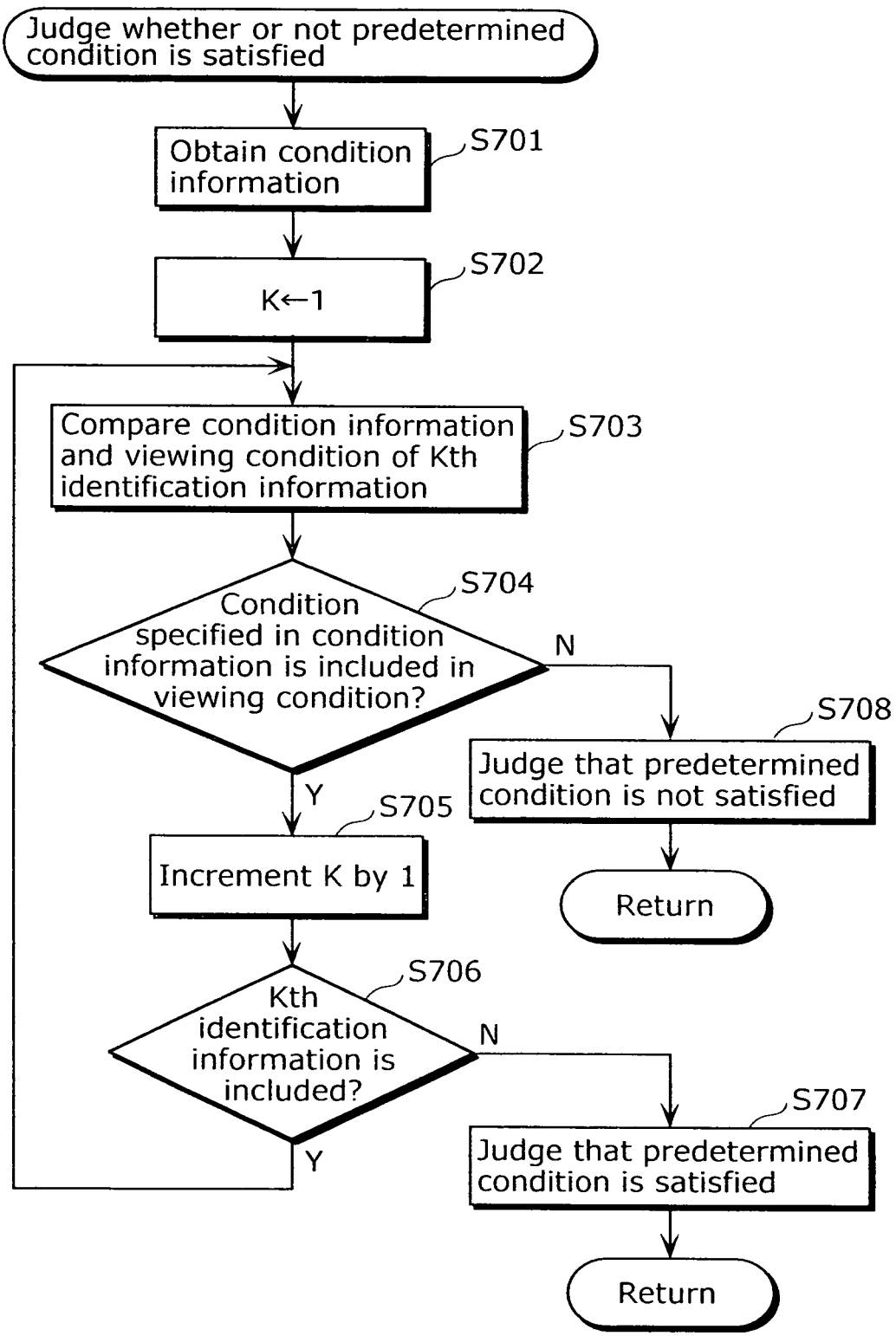
FIG. 7 is a flowchart illustrating the operation of a judgment process according to the first embodiment.

The following describes the judgment process of the judgment unit 203 using the flowchart shown in FIG. 7. This process is equivalent to the process in Step S312 in FIG. 3.

(Step S701) The judgment unit 203 obtains the condition information obtained by the condition information obtainment unit 208.

(Step S702) The judgment unit 203 substitutes "1" into a counter K.

(Step S703) The judgment unit 203 compares the condition information obtained in Step S701 and "viewing condition" of the Kth identification information among the plural pieces of identification information received by the identification information receiving unit 202, based on the identification information management table shown in FIG. 6.

(Step S704) The judgment unit 203 judges whether or not a condition specified in the condition information obtained in Step S701 is included in the viewing condition of the Kth identification information, as a result of the comparison made in Step S703. In the case where such a condition is included in the viewing condition, the process moves to Step S705, and in the case where it is not included, the process moves to Step S708.

(Step S705) The judgment unit 203 increments the counter K by "1".

(Step S706) The judgment unit 203 judges whether or not the Kth identification information is included in the identification information received by the identification information receiving unit 202. In the case it is included, the process returns to Step S703, and in the case it is not included, the process moves to Step S707.

(Step S707) The judgment unit 203 judges that "a predetermined condition is satisfied" by the plural pieces of identification information. Then, the process returns back to the upper function.

(Step S708) The judgment unit 203 judges that "a predetermined condition is not satisfied" by the plural pieces of identification information. Then, the process returns back to the upper function.

Here, the judgment unit 203 judges that "a predetermined condition is not satisfied" by the plural pieces of identification information since the viewing condition associated with the identification information "100112", out of the identification information received by the identification information receiving unit 202, includes the condition information "TV-14" which associated with the image information "movie 03" which is currently being reproduced, but the viewing condition associated with the identification information "184118" does not include the condition information "TV-14".

The output control unit 204 performs control that is pre-set to the output unit 201, based on the judgment "a predetermined condition is not satisfied". Here, as an example, control is performed so that the output of the image information "movie 03", which is currently being outputted based on the identification information for which the judgment is made as "a predetermined condition is not satisfied", is stopped.

Assuming that a parent holds the information terminal 10a and a child at the age of 14 or less holds the information terminal 10b. In the case where the parent having the information terminal 10a views an image in the living room in which the image output apparatus 20 is placed, the output of the image is stopped when a 13-year-old child having the information terminal 10b enters the living room. Thus, it is possible to prevent the 13-year-old-child from viewing images interdicted to children at the age of 14 or less.

For example, with the conventional technique such as parental lock or the like, it has been possible to restrict children from operating the output of interdicted images. Nevertheless, when a parent operates to output such images, a child in the same room views interdicted images as a result. However, according to the concrete example described above, even when a parent is viewing such images, it is possible to stop the display of the images when a child enters the same room. This further ensures the interdiction of viewing of inappropriate images by children.

Here, assuming that the identification information of the information terminal 10b is "171344" but not "184118", since the viewing condition associated with the identification information "171344" includes the condition information "TV-14" associated with the image information "movie 03" which is currently being reproduced, the judgment unit 203 judges that "a predetermined condition is satisfied" by the identification information.

Based on the judgment of the judgment unit 203 that "a predetermined condition is satisfied" by the identification information, the output control unit 204 does not change the output from the output unit 201. Therefore, the output unit 201 continues outputting the image information "movie 03".

As described above, according to the embodiment, it is judged whether or not plural pieces of identification information received from plural information terminals satisfy a predetermined condition so that the output of the output unit 201 is controlled based on the judgment. Therefore, it is possible to thoroughly limit the output of the image information to plural users. For example, it is possible to allow the output of image information only in the case where the plural identification information satisfy a condition for continuing the output of the image information being outputted by the output unit 203. Thus, even with one user judged as inappropriate for the continuation of the output of the image information, it is possible to limit the output of the image information, for example, to stop the output based on the information terminal held by the inappropriate user.

Note that in the concrete example as described above, a numerical value available as a predetermined condition may be provided in stead of the condition information associated with the image information and furthermore, a numerical value may be given as identification information, so that the judgment unit 203 judges whether or not plural pieces of identification information satisfy a predetermined condition. For example, a numerical value may be set for the minimum age to allow the viewing of image information, a numerical value indicating the age of each user who holds an information terminal may be set as the identification information of the information terminals 10a and 10b. Thus, whether or not the numerical value of each identification information indicates a numerical value associated with the image information which is being outputted, or greater, and the judgment unit 203 may judge that plural pieces of identification information satisfy a predetermined condition, only in the case where all the identification information indicate the numerical value or greater.

In the example described above, attribute values of "viewing condition" in the identification information management table shown in FIG. 6 may be used as the identification information of the information terminals 10a and 10b.

The example shows the case where the output control unit 204 stops the output of the image information being outputted by the output unit 201, based on the judgment made by the judgment unit 203. However, according to the embodiment, the output unit 201 may switch the currently-outputted image information to other pre-set image information.

In stead of the image information storage unit 205, the output unit 201 may be equipped with an image receiving unit which externally receives image information. Such a receiving unit can be realized, for example, using the techniques of terrestrial broadcast tuners, satellite broadcast tuners and cable television tuners and the like. In this case, for example, a condition, which is used by the judgment unit 203 for judging whether or not an output can be operated, may be set and previously stored in a memory or the like so that the judgment unit 203 judges whether or not the plural pieces of identification information received by the identification information receiving unit 202 satisfy a condition for outputting the channel via which the image information is being outputted by the output unit 201. In the case where the plural pieces of identification information do not satisfy the condition, the channel via which the image information is being outputted may be switched to another channel.

In the case where the output unit 201 outputs different image information using one or more windows, the judgment unit 203 judges whether or not the respective image information outputted to each window satisfy a predetermined condition based on the identification information received by the identification information receiving unit 202, and the output control unit 204 may close the window via which the image information judged as not satisfying the predetermined condition based on the judgment is outputted. This applies to other embodiments as well. Note that the configuration of outputting images to windows or the like is a known technology, and the description shall be omitted.

Note that, in stead of condition information, the information for specifying plural pieces of identification information associated with respective image information may be previously set for each of the image information. The judgment unit 203 may obtain the information for specifying the pre-set pieces of identification information associated with the image information which is being outputted, and judge whether or not the pre-set pieces of identification information respectively correspond to the plural identification information received by the identification information receiving unit 202, instead of executing Steps S311 and S312. With such a process, by previously setting, for one image information, the respective identification information of the information terminals held by all the family members, for example, it is possible to perform setting so that it is not possible to continue viewing the image information unless all the family members are present. Therefore, for the image information determined as to be viewed by all the members, it is possible to view the information with the same degree of progress, so that the event in which one of the members miss the image information shall not happen. This applies to other embodiments as well.

In the concrete example described above, it may be defined that the judgment unit 203 judges the combination of plural pieces of identification information and the output control unit 204 controls the output of the image information based on the judgment. For example, assuming that there are identification information A and B, the control of the output may be performed differently between the case where the plural pieces of identification information includes the identification information A but does not include the identification information B; and the other cases. Alternatively, the control of the output may be performed differently between the case where the plural identification information includes either the identification information A or the identification information B, and the other cases. Also, assuming that there is identification information C, the control of the output may be performed differently between the case where the plural identification information includes all the identification information A, B and C, and the other cases. The same applies to other embodiments as well.

For example, the judgment unit 203 may count the number of identification information and judge whether or not the number is not less than a predetermined number, so that the control of the output may be performed differently between the case where the number is not less than the predetermined number and the case where the number is less than the predetermined number. In this case, by setting the condition so that unless the number of identification information is not less than 5, the output of the image information is not performed, for example, it is not possible to output images when only one person having the identification information is present. Thus, it is possible to define the setting so that one cannot output the image information individually and the output is performed only in the case of viewing the image information with all the members present at the same time, which reduces the power consumption. The same applies to other embodiments as well.

Note that the embodiment describes only the case of using image information; however, the present invention is applicable to the case of using audio information and a combination of image information and audio information. This applies to other embodiments.

Note that it is preferable to allow the communication only in the case where the identification information transmitted from the information terminals 10a and 10b are within a predetermined area such as the case where the information terminals 10a and 10b and the image output apparatus 20 are located in the same room or in the same house. With this, the image output apparatus 20 can control output based on the plural pieces of identification information transmitted from the plural information terminals located within the predetermined area. For example, in the case where the user holding the information terminal 10a and the user holding the information terminal 10b are in the same room in which the image output apparatus 20 is placed, the identification information receiving unit 202 of the image output apparatus 20 receives the respective identification information, the judgment unit 203 judges whether or not the two identification information satisfy a predetermined condition, so that the control of the output is performed by the output control unit 204. In contrast, unless one of the user holding the information terminal 10a and the user holding the information terminal 10b is in the same room in which the image output apparatus 20 is placed, the identification information transmitted from the information terminal held by the user who is not in the same room, that is, the identification information transmitted from the information terminal held by the user who cannot view the image information outputted from the image output apparatus 20, is not received by the identification information receiving unit 202 of the image output apparatus 20. Therefore, it is possible to control so that the image information is not outputted.

Note that, in order to have such a configuration, in the case where the transmission of the identification information from the information terminals 10a and 10b is wireless, the output of the transmission unit 102 may be set so that the electric wave transmitted from the information terminals 10a and 10b reaches only the image output apparatus 20 placed in the same room, e.g., the distance for the electric wave to reach may be set to approximately several meters. In this case, the user may adjust the output of the transmission unit 102 according to the size of the room in which the image output apparatus 20 is placed. Also, the electric wave of a waveband that is hard to pass through the wall of the room may be used as the waveband of the electric wave transmitted from the information terminals 10a and 10b. The identification information from the information terminals 10a and 10b may be transmitted using infrared which does not pass through the wall. This applies to other embodiments as well.

Second Embodiment

In the image output system according to the second embodiment, the output of the image information for which an output instruction has been received is controlled based on plural pieces of identification information received from plural information terminals in stead that the output of the image information which is currently being outputted by the output unit is controlled.

Figure 8:
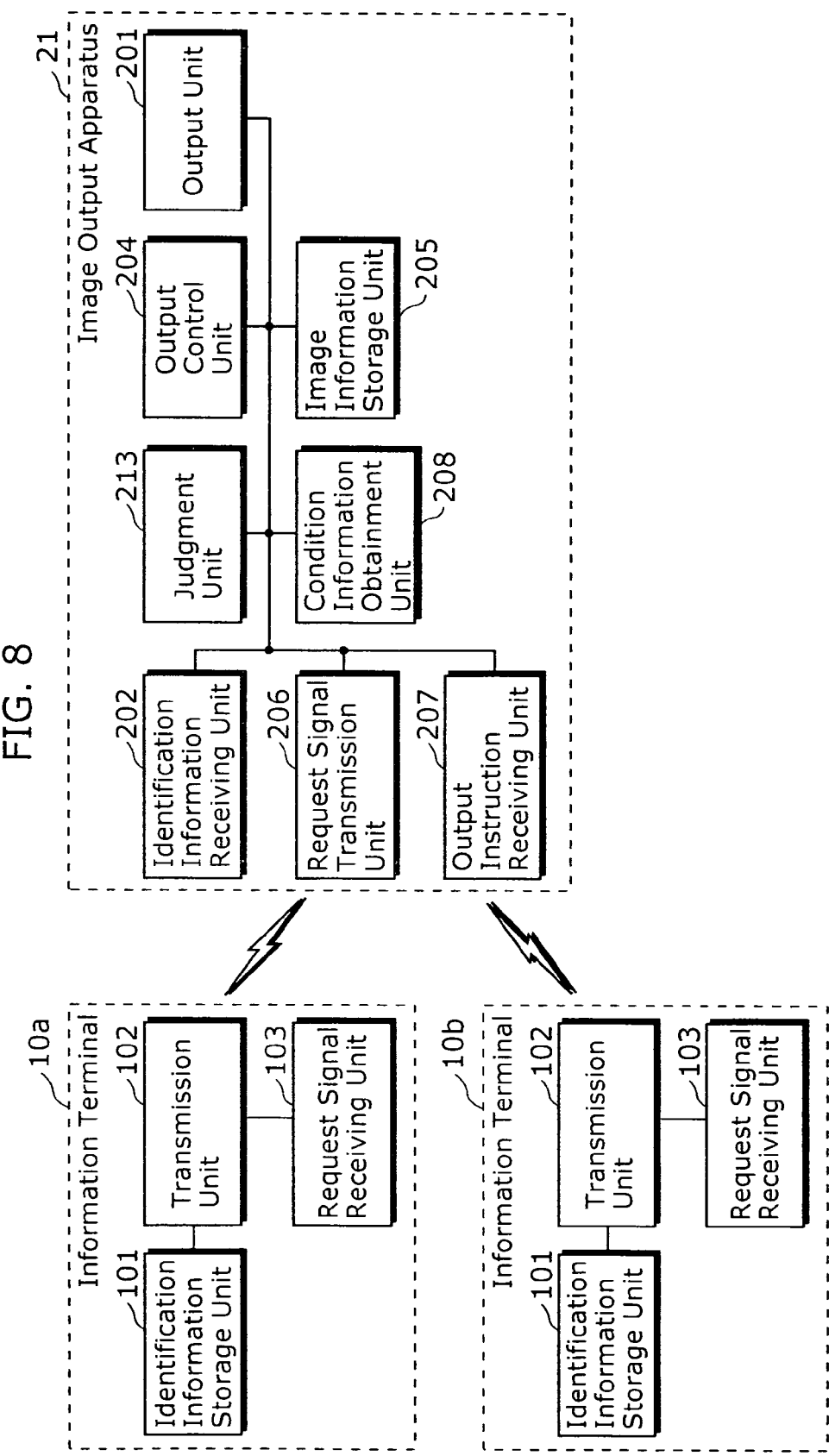
FIG. 8 is a block diagram illustrating the operation of the image output apparatus according to a second embodiment.

FIG. 8 is a block diagram showing the configuration of the image output system according to the second embodiment.

The image output system is configured of the information terminals 10a and 10b as well as an image output apparatus 21. Note that the embodiment describes the case of using two information terminals. The present invention, however, is also applicable to the case of using plural information terminals having the same configuration as that of the information terminals 10a and 10b.

Since the configuration of the information terminals 10a and 10b are as same as the one described in the first embodiment, the description shall be omitted.

The image output apparatus 21 includes the output unit 201, the identification information receiving unit 202, a judgment unit 213, the output control unit 204, the image information storage unit 205, the request signal transmission unit 206, the output instruction receiving unit 207, and the condition information obtainment unit 208. The configurations of the output unit 201, the identification information receiving unit 202, the output control unit 204, the image information storage unit 205, the request signal transmission unit 206, the output instruction receiving unit 207, and the condition information obtainment unit 208 are as same as those described in the first embodiment, and the descriptions shall be omitted.

The judgment unit 213 judges whether or not the respective identification information received by the identification information receiving unit 202 satisfies a predetermined condition. The judgment unit 213 is as same as the judgment unit 203 of the image output system according to the first embodiment, except that the judgment unit 213 judges whether or not the respective identification information received by the identification information receiving unit 202 satisfies a predetermined condition associated with the image information that the output unit 201 attempts to output. Therefore, the detailed description shall not be repeated here.

Next, the operation of the image output system according to this embodiment shall be described.

The operation of the information terminals 10a and 10b is as same as that described in the first embodiment, and the description shall be omitted.

Figure 9:
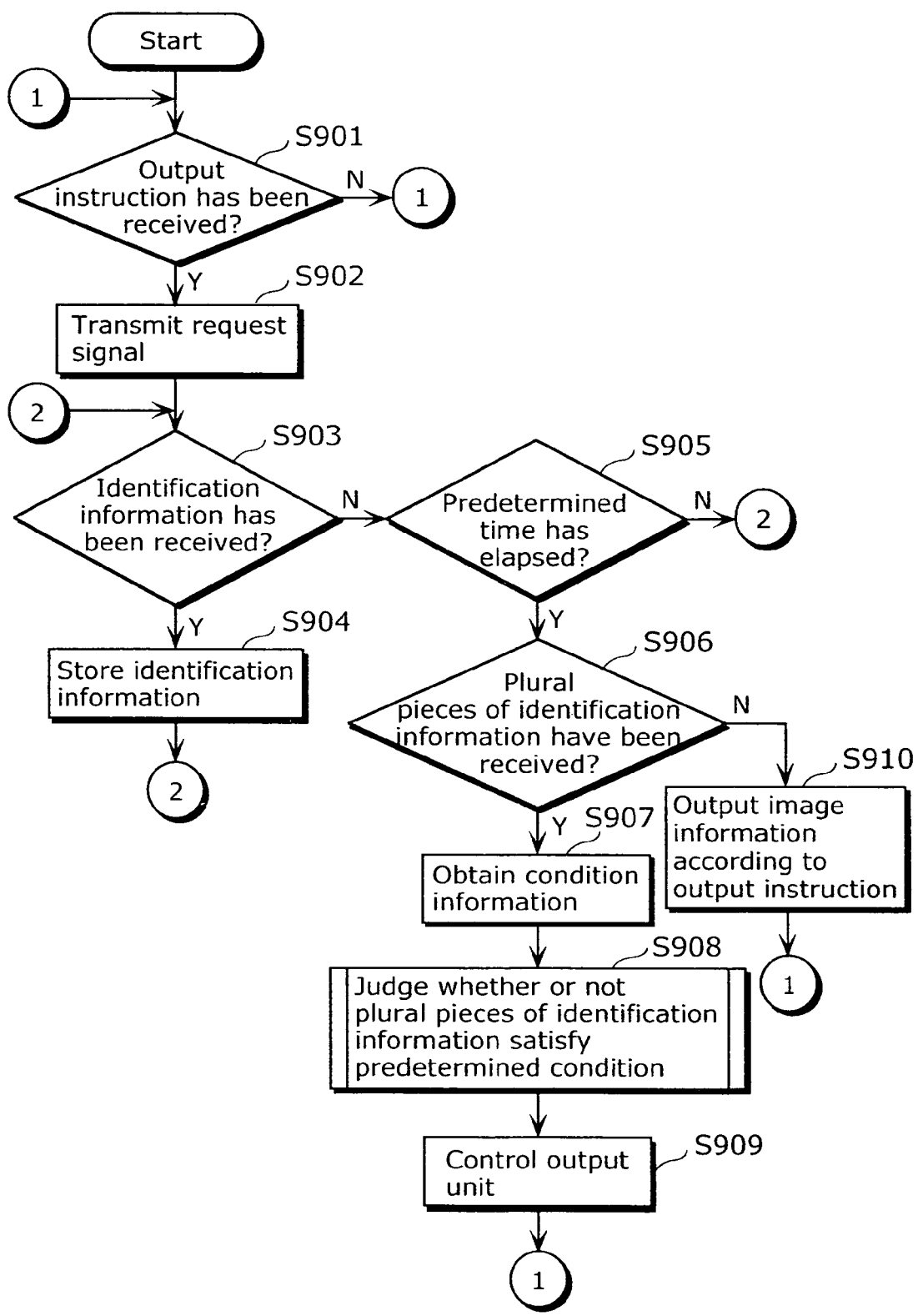
FIG. 9 is a flowchart illustrating the operation of the image output apparatus according to the second embodiment.

The operation of the image output apparatus 21 is described using the flowchart shown in FIG. 9.

(Step S901) The output instruction receiving unit 207 judges whether or not an output instruction has been received. In the case an output instruction has been received, the process moves to Step S902. In the case an output instruction has not been received, the process returns back to Step S901. Note that, in Step S901 immediately after the power is turned on, the image information which is stored in a memory or the like and has been displayed when the power is turned off, and an output instruction for outputting default image information may be received.

(Step S902) The request signal transmission unit 206 transmits a request signal.

(Step S903) The identification information receiving unit 202 judges whether or not identification information has been received. In the case where identification information has been received, the process moves to Step S904, and in the case where identification information has not been received, the process moves to Step S905.

(Step S904) The identification information receiving unit 202 stores the identification information received in Step S903 in a storage medium such as a memory or the like. Note that the storage may be temporary. Then, the process returns back to Step S903.

(Step S905) The identification information receiving unit 202 judges whether or not a predetermined time has elapsed after the request signal transmission unit 206 has transmitted the request signal. The predetermined time may be set based, for example, on a processing speed of an information terminal, the number of information terminals, and a timing at which an information terminal transmits identification information. In the case where the predetermined time has elapsed, the process moves to Step S906, and in the case where the predetermined time has not elapsed, the process returns back to Step S903.

(Step S906) The judgment unit 213 judges whether or not the identification information receiving unit 202 has received plural pieces of identification information. For example, the judgment unit 213 can count the number of the identification information stored in the memory or the like, and judge whether or not the number of the received identification information is plural based on a reception history of the identification information received by the identification information receiving unit 202. In the case of having received plural pieces of identification information, the process moves to Step S907, and in the case of not having received plural pieces of identification information, the process returns back to Step S910.

(Step S907) The condition information obtainment unit 208 obtains the condition information associated with the image information outputted from the output unit 201, especially the image information for which an output instruction has been received. Also, the condition information obtainment unit 208 may obtain the condition information associated with the channel for which an output instruction has been received. Note that in the case where a predetermined condition associated with image information is not necessary, this step can be omitted.

(Step S908) The judgment unit 213 judges whether or not the plural pieces of identification information stored in Step S904 satisfy the predetermined condition obtained in Step S907. A concrete example of this process shall be mentioned later.

(Step S909) The output control unit 204 controls the output of the output unit 201 based on the judgment made by the judgment unit 213 in Step S908. The control performed by the output control unit 204 is, for example, a control of switching the image information. The kind of control to be performed by the output control unit 204 may be previously set in a memory. Also, the information for setting the kind of control to be performed by the output control unit 204 may be added to the image information that is being outputted by the output unit 201, so that the output control unit 204 reads out the information according to the judgment, and controls the output unit 201 based on the information. Note that the output control unit 204 does not need to change the output depending on the result of the judgment. Then, the process returns back to Step S901.

(Step S910) The output unit 201 outputs the image information according to the output instruction received in Step S901. Then, the process returns back to Step S901.

Note that in the case where the image output apparatus 21 does not transmit a request signal, the process in Step S902 may be omitted.

Also, note that in the flowchart shown in FIG. 9, the process terminates by the interruption caused by the fact the power is turned off or the process is terminated.

The following describes a concrete operation of the image output system according to the embodiment. In the conceptual diagram of the image output system shown in FIG. 4, the image output apparatus 21, instead of the image output apparatus 20, is included. Note here that the image output apparatus 21 does not include the image information storage unit 205, but the output unit 201 is equipped with a TV tuner (not shown in the diagram).

The identification information storage unit 101 of the information terminal 10a stores identification information "100112" while the identification information storage unit 101 of the information terminal 10b stores identification information "184118".

FIG. 10 is a diagram showing a channel management table for managing the channels which can be received by the output unit 201 of the image output apparatus 21. The channel management table has attributes such as "number", "broadcast station", "condition information", and "selection flag". "Number" indicates a channel number. "Broadcast station" indicates a name of broadcast station. "Condition information" is condition information obtained by the condition information obtainment unit 208, and here, it is a condition for restricting a viewer from viewing the image information that is broadcast via a channel. The "condition information" may be embedded in or added to the image information that is broadcast via the channel, or may be set by the user as needed. Here, the user shall previously set the condition information in the image output apparatus 21.

With regard to the condition information, "TV-Y7" indicates that a channel is the one that broadcasts the image information targeting the users at the age of 7 or above, "TV-Y14" indicates that a channel is the one that broadcasts the image information targeting the users at the age of 15 or above, "TV-MA" indicates that a channel is the one that broadcasts the image information targeting the users at the age of 18 or above, and "TV-G" indicates that a channel is the one that broadcasts the image information targeting general users. "Selection flag" is information indicating that a channel is a channel that is presently being selected. Here, the "selection flag" of the image information that is currently being selected shall be set to "1" and the "selection flag" of other image information shall be set to "0" by the output unit 201 or the like. For example, "selection flag" of the channel that has been selected when the power of the image output apparatus 21 is turned off is in the state of "1", and shall be stored when the power of the image output apparatus 21 is turned off.

Firstly, it is assumed that only a user holding the information terminal 10a is in the room in which the image output apparatus 21 is placed.

Assuming that the user holding the information terminal 10a has turned on the power of the image output apparatus 21, pressed a key or the like of the information terminal 10a, and transmitted, through infrared communication, an output instruction for instructing the output of the channel "RSS TV" of the channel 4 shown in FIG. 10.

When the output instruction receiving unit 207 of the image output apparatus 21 receives an output instruction from the information terminal 10a, the request signal transmission unit 206 transmits a request signal. The output for transmitting the request signal shall be adjusted so that the range in which the request signal can be received is limited to the room in which the image output apparatus 21 is placed.

The information terminal 10a, having received the request signal, transmits the identification information "100112" stored in the identification information storage unit 101, according to the request signal.

Since the only identification information received by the image output apparatus 21 is the identification information transmitted by the information terminal 10a, the output unit 201 selects the channel 4 based on the output instruction to output the image information of the channel "RSS TV" of the channel 4, and outputs the image information of the channel 4. The display 40 displays the images based on the image information of the channel 4. As shown in the channel management table in FIG. 10, the attribute "selection flag" of the record which includes an attribute value of "RSS TV" is set to "1".

Note that, in this case, the output unit 201 may surely judge whether or not the image information of the channel, for which an output instruction has been received, can be outputted, based on the identification information "100112" provided only for the user in the room.

Here, it is assumed that the user holding the information terminal 10b enters the room in which the image output apparatus 21 is placed.

It is also assumed that the user holding the information terminal 10a or the information terminal 10b has pressed a key or the like of either terminal, and transmitted an output instruction to output the channel "WWW TV" of the channel 2 shown in FIG. 10 to the image output apparatus 21 through infrared communication.

When the output instruction receiving unit 207 of the image output apparatus 21 receives an output instruction from the information terminal 10a, the request signal transmission unit 206 transmits a request signal.

The information terminal 10a, having received the request signal, transmits the identification information "100112" stored in the identification information storage unit 101, according to the request signal. The information terminal 10b, having received the request signal, transmits the identification information "184118" stored in the identification information storage unit 101, according to the request signal.

The image output apparatus 21, having received the identification information transmitted by the information terminals 10a and 10b, obtains, from the channel management table shown in FIG. 10, an attribute value "TV-14" of "condition information" of the record of the channel 2 for which an output instruction is received, since the identification information is received in plural (two in this case).

FIG. 11 shows an identification information management table for managing the identification information of the information terminals 10a and 10b. The identification information management table includes attributes such as "ID", "identification information" and "age". "ID" is information for managing identification information. "Identification information" is identification information stored in each of the information terminals. "Age" is information which is set by the users or the like, and indicates the age of each user who holds an information terminal associated with the identification information.

FIG. 12 is a condition information management table for managing condition information shown in FIG. 10, and the minimum age allowed to view the image information of the channel associated with the condition information. The condition information management table has attributes such as "ID", "condition information" and "minimum age". "Condition information" is information associated with the condition information shown in FIG. 10. "Minimum age" is the minimum age allowed to view the image information via the channel of the condition information. Each "minimum age" may be previously set to a factory default or may be set by the user as needed.

The judgment unit 213 judges whether or not all the respective identification information received by the identification information receiving unit 202 satisfies a predetermined condition for outputting the image information of the channel associated with the condition information "TV-14". To be precise, "predetermined condition" is a condition such as "an attribute value of "age", in the identification information management table, which is associated with the identification information is equal to or greater than "minimum age" associated with the condition information "TV-14" which is obtained from the condition information management table by the condition information obtainment unit 208".

Figure 13:
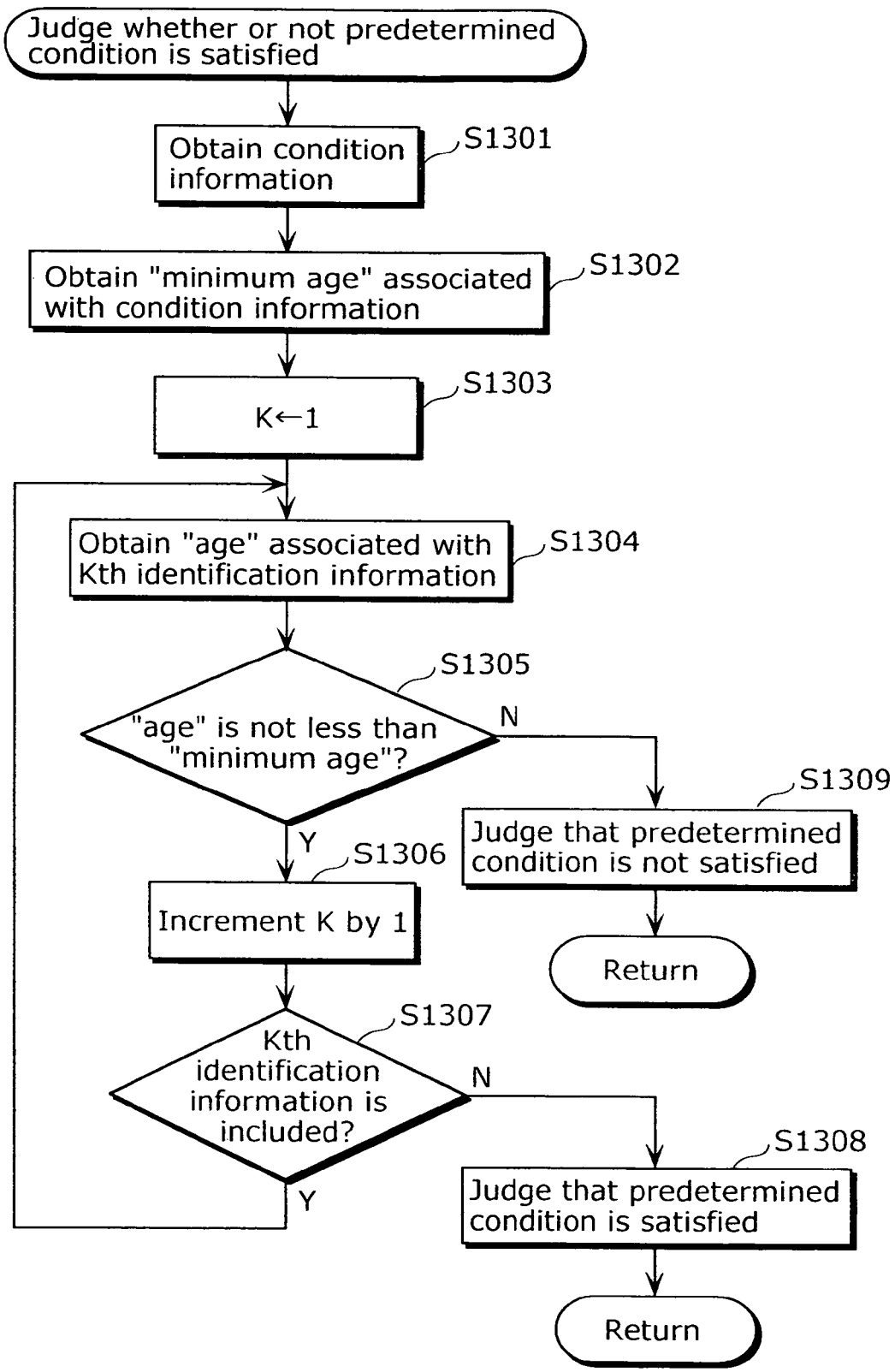
FIG. 13 is a flowchart illustrating the operation of the judgment process according to the second embodiment.

The following describes the judgment process of the judgment unit 213 using the flowchart shown in FIG. 13. The process is equivalent to the process in Step S908 in FIG. 9.

(Step S1301) The judgment unit 213 obtains the condition information obtained by the condition information obtainment unit 208, that is, "TV-14" in this case.

(Step S1302) The judgment unit 213 obtains, from the condition information management table shown in FIG. 12, "minimum age" associated with the condition information obtained in Step S1301. Here, a value of "15" associated with the condition information "TV-14" is obtained.

(Step S1303) The judgment unit 213 substitutes "1" into a counter K.

(Step S1304) The judgment unit 213 obtains "age" associated with the Kth identification information out of the identification information received by the identification information receiving unit 202, based on the identification information management table shown in FIG. 11.

(Step S1305) The judgment unit 213 judges whether or not the value of "age" obtained in Step S1304 is not less than the value of "minimum age" obtained in Step S1302. In the case where it is not, the process moves to Step S1306, and in the case where it is, the process moves to Step S1309.

(Step S1306) The judgment unit 213 increments the counter K by "1".

(Step S1307) The judgment unit 213 judges whether or not the identification information received by the identification information receiving unit 202 includes the Kth identification information. In the case where it does, the process returns to Step S1304, and in the case where it does not, the process moves to Step S1308.

(Step S1308) The judgment unit 213 judges whether or not "a predetermined condition is satisfied" by plural pieces of identification information. Then, the process returns to the upper function.

(Step S1309) The judgment unit 213 judges whether or not "a predetermined condition is not satisfied" by plural pieces of identification information. Then, the process returns to the upper function.

Here, the judgment unit 213 judges that "a predetermined condition is not satisfied" by the plural pieces of identification information since the age "34" associated with the identification information "100112" out of the identification information received by the identification information receiving unit 202 is equal to or greater than the minimum age "15" associated with the condition information "TV-14" which is associated with the channel 2 for which an output instruction has been received, whereas the age "12" associated with the identification information "184118" is less than the minimum age "15" associated with the condition information "TV-14" which is associated with the channel 2 for which an output instruction has been received.

The output control unit 204 performs control which is previously set for the output unit 201, based on the judgment made by the judgment unit 213. Here, the output control unit 204 performs control so that the output unit 201 outputs the image information of the channel 1, instead of channel 2, which has the channel number smaller than the channel number of the channel 2.

Assuming that a 34-year-old-parent holds the information terminal 10a and a 12-year-old-child holds the information terminal 10b, and in the case where the parent holding the information terminal 10a attempts to view the images of a channel which interdicts the viewing by the users below 14 year old, in the living room in which the 12-year-old-child is present, the intended channel is not selected but other channel is selected, so that the image information that is broadcast via the selected channel is outputted. Thus, it is possible to surely prevent the interdicted images from being viewed by the 12-year-old-child.

As described above, according to the embodiment, whether or not the plural pieces of identification information received from plural information terminals satisfy a predetermined condition is judged so that the output of the output unit 201 is controlled based on the judgment. It is thus possible to thoroughly limit the output of the image information. For example, only in the case where plural pieces of identification information satisfy a condition for outputting the image information or channel for which an output instruction has been received, the output can be performed. In this way, in the output of image information or channel, even with one user who is not qualified to view the image information or channel, it is possible to limit the output of the image information or channel by stopping the output or by outputting other image information or channel, based on the information terminals held by the users.

Note that the concrete example shows that the judgment unit 213 judges whether or not a predetermined condition for selecting a channel is satisfied, based on the minimum age derived from the condition information associated with the channel. However, instead of such a judgment, the judgment unit 213 may judge whether or not the channel for which an output instruction has been received can be selected, based on the plural pieces of identification information as described in the concrete example of the first embodiment using FIG. 7. The example describes the case where the output unit 201 outputs the image information of a predetermined channel. The present invention, however, is not limited to this, and the output unit 201 may output the image information stored in the image information storage unit 205 or the like, as in the case of the first embodiment.

Note that the configuration of the second embodiment may be combined with the configuration of the first embodiment. In such a case, the judgment unit 203 and the judgment unit 213 may be realized as one judgment unit having the same function as the judgment units 203 and 213.

Third Embodiment

The image output system according to the third embodiment applies the system described in the first embodiment, and includes an output unit which outputs a list made up of listed items associated with one or more pieces of image information which can be outputted as well as controls the output of the list based on the plural pieces of identification information received from plural information terminals.

Figure 14:
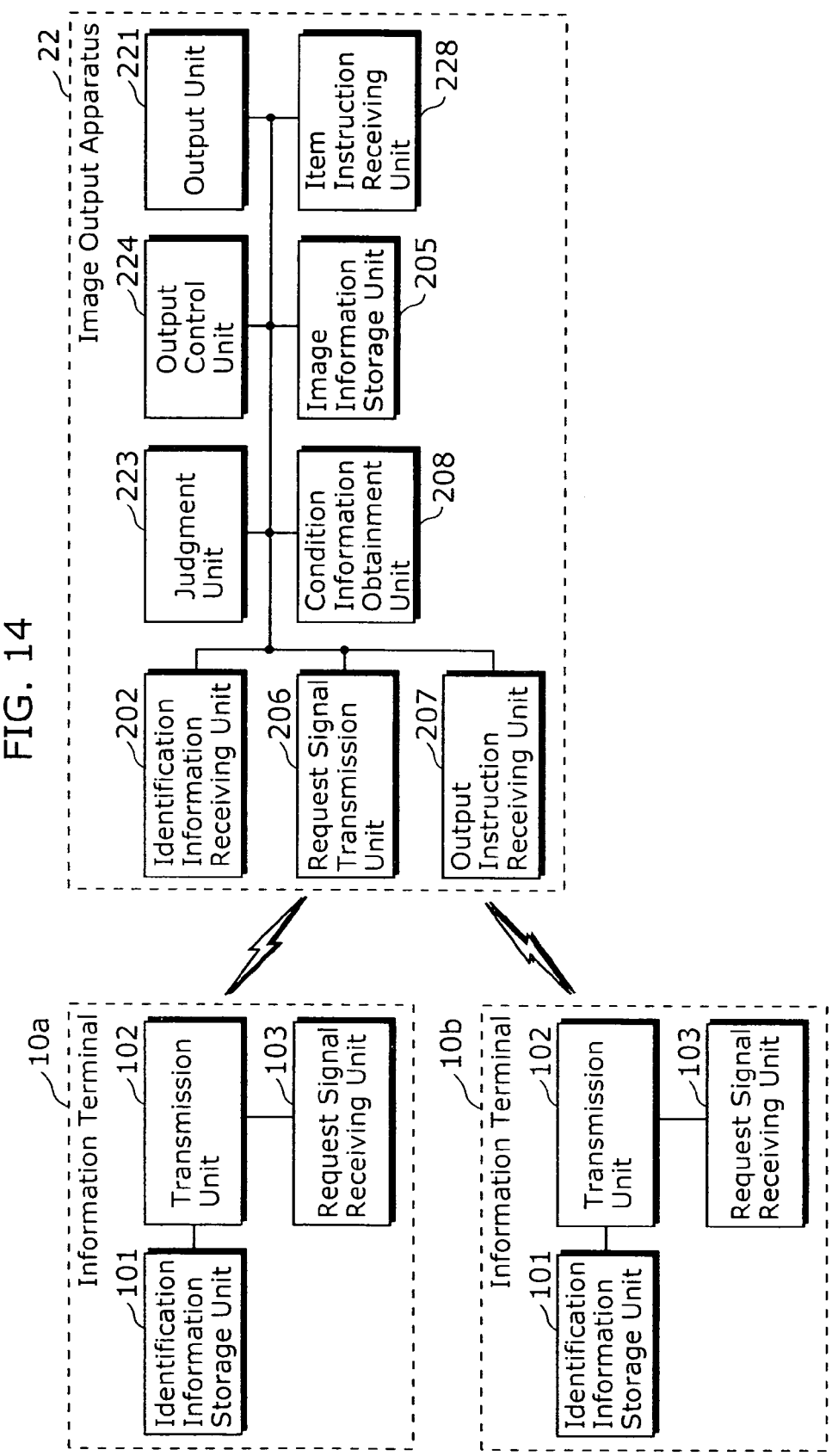
FIG. 14 is a block diagram showing the image output system according to a third embodiment.

FIG. 14 is a block diagram showing the configuration of the image output system according to the third embodiment. The image output system includes the information terminals 10a and 10b and an image output apparatus 22. Note that the embodiment describes the case of using two information terminals. The present invention, however, is also applicable to the case of using plural information terminals having the same configuration as that of the information terminals 10a and 10b.

Since the configuration of the information terminals 10a and 10b are as same as the one described in the first embodiment, the description shall be omitted.

The image output apparatus 22 includes an output unit 221, the identification information receiving unit 202, a judgment unit 223, an output control unit 224, the image information storage unit 205, the request signal transmission unit 206, the output instruction receiving unit 207, an item instruction receiving unit 228, and the condition information obtainment unit 208. The configurations of the identification information receiving unit 202, the image information storage unit 205, the request signal transmission unit 206, the output instruction receiving unit 207, and the condition information obtainment unit 208 are as same as those described in the first embodiment, and the descriptions shall be omitted.

The output unit 221 has the same configuration as that of the output unit 201 of the first embodiment and further outputs a list made up of listed items associated with one or more pieces of image information which can be outputted by the output unit 221. To be more concrete, the output unit 221 obtains listed item information which is information for outputting a listed item, from the image information which can be outputted. The listed item information may be, for instance, attribute information such as the name of image information, and ID, thumbnail images which is added to the image information or created using the image information, preview images or icons having a short reproduction time.

The output unit 221 may change a manner in which the listed items are outputted, depending on the image information. The change of the outputting manner means, for example, to change the type of display such as whether to output the image information as a thumbnail image or a character string, or to change the degree of brightness or transparency or whether or not to output the listed items even in the case of an output of the same thumbnail. The technique applied by the output unit 201 to obtain the information necessary for outputting such a list from the image information stored in the image information storage unit 205 and to create the necessary information is a known technology, and the detailed descriptions shall be omitted here. The description of the configuration as same as the output unit 201 of the first embodiment is also omitted.

The judgment unit 223 judges whether or not the respective identification information received by the identification information receiving unit 202 satisfies a predetermined condition. To be more concrete, in the case where the output unit 221 outputs a list, the judgment unit 223 judges, for the respective image information which can be outputted, whether or not the respective identification information received by the identification information receiving unit 202 satisfies a predetermined condition for outputting each piece of image information. Aside from this feature, the judgment unit 223 is as same as the judgment unit 203 of the image output system according to the first embodiment. Therefore, the detailed description shall not be repeated here. Note that "the respective image information which can be outputted by the output unit 221" means the image information which can be outputted by the output unit 221 in the case where at least plural pieces of identification information satisfy a predetermined condition. Such image information is stored in the image information storage unit 205, for instance.

The output control unit 224 controls the output unit 221 so that the mode of outputting the listed items, which are associated with each piece of image information to be outputted based on the plural pieces of identification information judged as satisfying a predetermined condition, differs from the manner of outputting the listed items associated with other image information. The output control unit 224 controls the output unit 221 to output image information associated with a listed item only in the case where the item instruction receiving unit 228 has received an instruction to select the listed item associated with the image information to be outputted based on the identification information judged as satisfying the predetermined condition. Note that the configuration other than this is as same as the configuration of the output control unit 204 of the first embodiment, and the detailed description shall be omitted.

The item instruction receiving unit 228 receives an item instruction which is an instruction to select a listed item in the list outputted by the output unit 221. The item instruction receiving unit 228 receives an instruction to select a listed item, for example, through the selection using a mouse, a cursor or the like of the listed item outputted in the list. Alternatively, the item instruction receiving unit 228 receives an instruction to select a listed item by inputting the name of the listed item or the like via a keyboard. The output unit 221 obtains the image information based on the instruction indicated in the item instruction received by the item instruction receiving unit 228, and outputs images based on the obtained image information. The input received by the item instruction receiving unit 228 is an input via numeric keypads, a keyboard, a menu screen, or the like, and an input unit may be of any kind. The item instruction receiving unit 228 can be realized with a device driver of an input unit such as numeric keypads and a keyboard, or software for controlling a menu screen or the like.

The following describes the image output system according to the embodiment.

The operation of the information terminals 10a and 10b is as same as the one describes in the first embodiment, and the description shall be omitted.

Next, the operation of the image output apparatus 22 will be described using the flowchart shown in FIG. 15.

(Step S1501) The output instruction receiving unit 207 judges whether or not an instruction to output a list has been received. In the case where the instruction has been received, the process moves to Step S1502, and in the case where the instruction has not been received, the process returns to Step S1501.

(Step S1502) The request signal transmission unit 206 transmits a request signal.

(Step S1503) The identification information receiving unit 202 judges whether or not identification information has been received. In the case the identification information has been received, the process moves to Step S1504, and in the case where the identification information has not been received, the process moves to Step S1505.

(Step S1504) The identification information receiving unit 202 stores the identification information received in Step S1503 in a storage medium such as a memory. Note that the storage may be temporary. Then, the process returns back to Step S1503.

(Step S1505) The identification information receiving unit 202 judges whether or not a predetermined time has elapsed after the request signal transmission unit 206 has transmitted a request signal. The predetermined time may be set based, for instance, on a processing speed of an information terminal, the number of information terminals and a timing at which an information terminal transmits identification information. In the case where the predetermined time has elapsed, the process moves to Step S1506, and in the case the predetermined time has not elapsed, the process returns to Step S1503.

(Step S1506) The judgment unit 223 judges whether or not the identification information receiving unit 202 has received plural pieces of identification information. For example, the judgment unit 223 may count the number of identification information stored in a memory or the like, or judge whether or not the number of the identification information received is plural based on a history of receiving the identification information received by the identification information receiving unit 202. In the case where plural pieces of identification information have been received, the process moves to Step S1507, and in the case where the plural pieces of identification information have not been received, the process moves to Step S1513.

(Step S1507) The condition information obtainment unit 208 obtains, for each piece of image information, condition information associated with each piece of image information which can be outputted by the output unit 221, that is, condition information associated with each piece of image information stored in the image information storage unit 205. The judgment unit 223 judges whether or not the plural pieces of identification information stored in Step S1504 satisfy a predetermined condition which is set in association with such condition information. Note that the processing performed in this step will be mentioned later.

(Step S1508) The output unit 221 obtains listed item information for outputting a listed item associated with the image information stored in the image information storage unit 205, from each piece of image information, for example, and outputs a list listing the listed items obtained through the listed item information. Here, the output control unit 224 controls the output unit 221 so that the manner of outputting the listed item differs depending on whether or not the plural pieces of identification information stored in Step S1504 satisfy the predetermined condition, as judged by the judgment unit 223 in Step S1507. As a result, a listed item for which the outputting manner has been changed based on whether or not the plural pieces of identification information satisfy the predetermined condition associated with each piece of image information.

(Step S1509) The item instruction receiving unit 228 judges whether or not an instruction to select the listed item outputted in Step S1508 has been received. In the case where the instruction has been received, the process moves to Step S1510, and in the case where the instruction has not been received, the process moves to Step S1514.

(Step S1510) The output control unit 224 judges whether or not the image information associated with the listed item for which the selection instruction has been received in Step S1509, based on the judgment of the judgment unit 223 in Step S1507. To be more precise, in the case where the judgment made by the judgment unit 223 in Step S1507 indicates that the plural pieces of identification information stored in Step S1504 satisfy the predetermined condition associated with the image information of the listed item selected in Step S1509, the output control unit 224 judges that the image information can be outputted, and the process moves to Step S1511. In the case where the plural pieces of identification information do not satisfy the predetermined condition, the output control unit 224 judges that the image information cannot be outputted, and the process returns back to Step 1509.

(Step S1511) The output unit 221 terminates the output of the list.

(Step 1512) The output control unit 224 controls the output unit 221 and causes the output unit 221 to output the image information associated with the listed item for which the selection instruction has been received in Step S1509.

(Step S1513) The output unit 221 obtains the listed item information for outputting the listed item associated with the image information stored in the image information storage unit 205, from each piece of image information, for example, and outputs the list listing the listed items obtained based on the listed item information. Then, the process moves to Step S1509.

(Step S1514) The output unit 221 judges whether or not the output of the list is terminated. For example, in the case where the output instruction receiving unit 207 has received an instruction to stop the output of the list, the output unit 221 judges that the output of the list should be terminated. The list output may be terminated when the predetermined time has elapsed after the start of the output of the list. In the case of terminating the list output, the process moves to Step S1515, and in the case of not terminating the list output, the process returns back to Step S1509.

(Step S1515) The output unit 221 terminates the output of the list. Then, the process returns to Step S1501. Note that after the termination of the list output, the image information which has been displayed before the display of the list, or the like, may be outputted.

Figure 15:
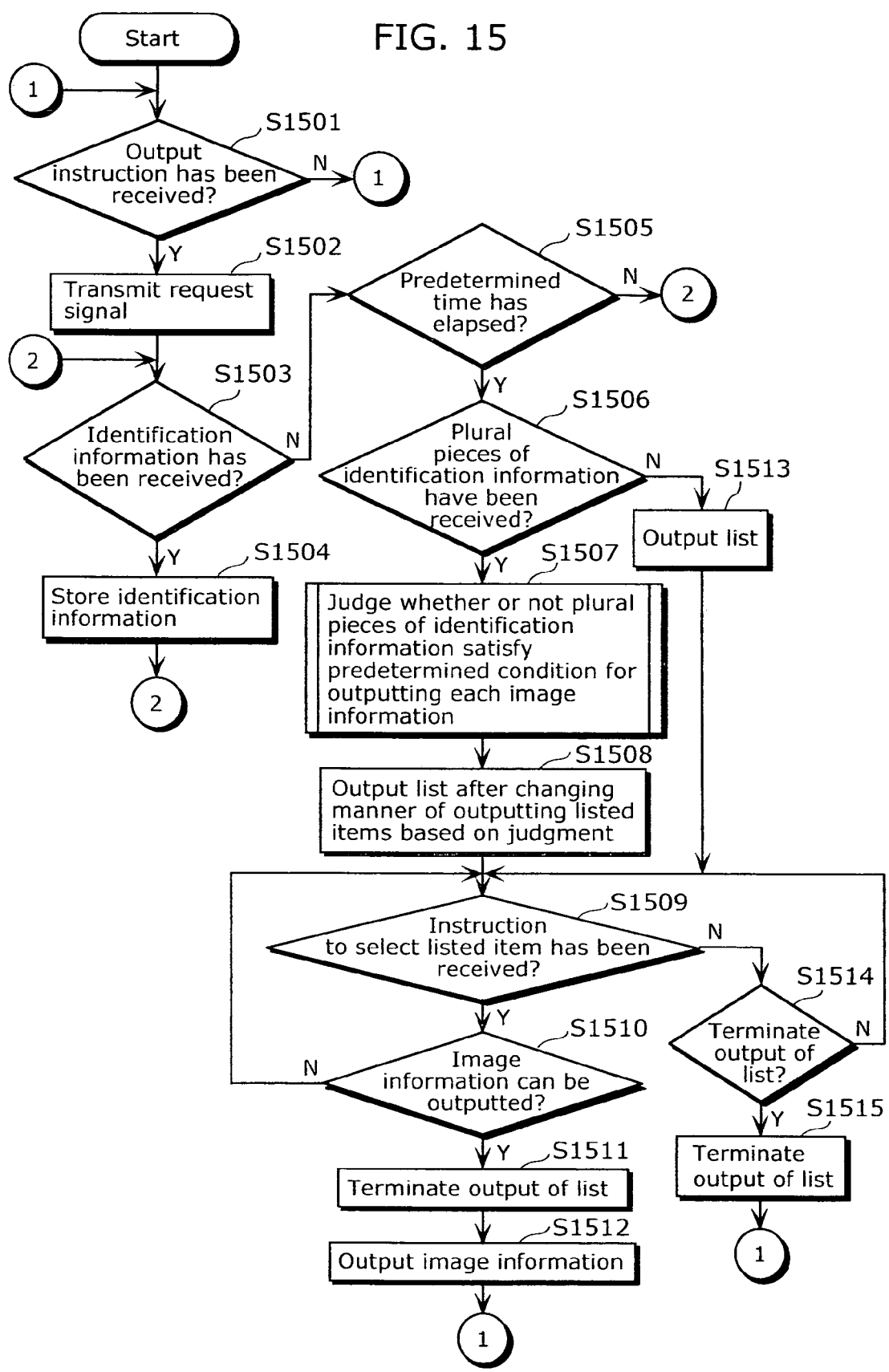
FIG. 15 is a flowchart illustrating the operation of the image output apparatus according to the third embodiment.

Note that, in the flowchart shown in FIG. 15, the process terminates by the interruption caused by the fact the power is turned off or the process is terminated.

The following describes the concrete operation of the image output system according to the embodiment. In the conceptual diagram of the image output system shown in FIG. 4, the image output apparatus 22 is included instead of the image output apparatus 20. Note here the embodiment shows an example that the image output apparatus 22 stores plural image information within the image information storage unit 205. Also, the respective image information stored in the image information storage unit 205 shall be image information of moving pictures.

It is also assumed that the identification information storage unit 101 of the information terminal 10a stores the identification information "100112" while the identification information storage unit 101 of the information terminal 10b stores the identification information "184118", respectively.

Figures 16, 17:
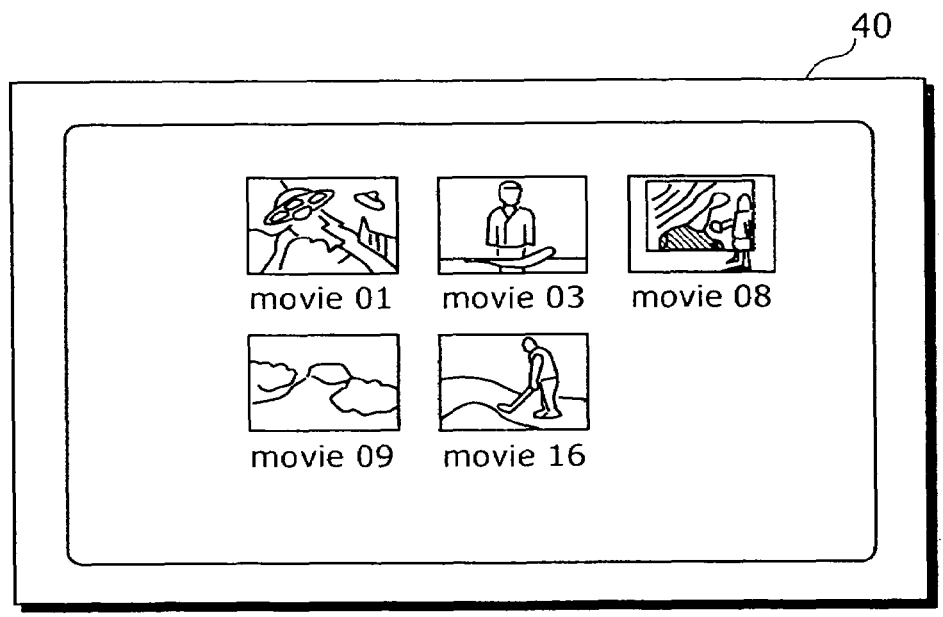
FIG. 16 is a diagram showing the image information management table according to the third embodiment.
FIG. 17 is a diagram showing a display example according to the third embodiment.

FIG. 16 is a diagram showing an image information management table for managing plural pieces of image information stored in the image information storage unit 205. The image information management table has attributes such as "ID", "name of image information", "condition information", "reproduction time" and "judgment flag". "ID" is information for managing the image information. "Name of image information" indicates the name of the image information. "Condition information" is a condition for limiting the viewer from viewing image information. Here, "condition information" may be previously embedded in or added to the image information. The user may set it as needed. Concerning the "condition information", "TV-Y7" indicates that image information targets the users at the age of 7 or above, "TV-Y14" indicates that the image information targets the users at the age of 15 or above, and "TV-MA" indicates that the image information targets the users at the age of 18 or above. "Reproduction time" is information indicating the time required for the reproduction of the image information. "Judgment flag" is information indicating the judgment made for image information by the judgment unit 223. In the case where the judgment of the judgment unit 223 indicates that a predetermined condition associated with each piece of image information is satisfied, "judgment flag" is set to "1", and in the case where the judgment indicates that a predetermined condition is not satisfied, "judgment flag" is set to "0".

Firstly, it is assumed that only a user holding the information terminal 10a is in the room in which the image output apparatus 22 is placed.

It is assumed that the user holding the information terminal 10a has turned on the power of the image output apparatus 22, pressed a key or the like of the information terminal 10a, and transmitted, through infrared communication, an output instruction for outputting a list of image information stored in the image output apparatus 22.

When the output instruction receiving unit 207 of the image output apparatus 22 receives an output instruction from the information terminal 10a, the request signal transmission unit 206 transmits a request signal. It is assumed that the output for transmitting the request signal is adjusted so that the range of receiving the request signal is limited to the room in which the image output apparatus 22 is placed.

The information terminal 10a, having received the request signal, transmits the identification information "100112" stored in the identification information storage unit 101, according to the request signal.

The only identification information received by the image output apparatus 22 is the identification information transmitted by the information terminal 10a. Therefore, based on the output instruction for instructing on the output of the list, the output unit 221 creates information related to thumbnail images based on each piece of image information stored in the image information storage unit 205, and obtains, as listed item information, the information related to the thumbnail images and the name of the image information. The process of creating the thumbnail image information based on the image information is a known technology, and the description shall be omitted. Then, the output unit 221 displays the list listing the listed item information of the obtained image information on the display 40, as shown in FIG. 17. Note that "judgment flag" of each piece of image information is set to "1" in the image information management table shown in FIG. 16.

Then, it is assumed that the user has operated a key of the information terminal 10a or the like, and transmitted, through infrared communication, an item instruction to select the listed item associated with "movie 01".

When the item instruction receiving unit 228 of the image output apparatus 22 receives, from the information terminal 10a, the item instruction to select the listed item associated with "movie 01", the output control unit 224 judges whether or not "judgment flag" of the record, which is for managing the image information "movie 01" associated with the listed item selected in the image information management table shown in FIG. 16, indicates "1". In the case where "judgment flag" indicates "1", the output control unit 224 judges that the image information associated with the listed item can be outputted, and in the case where "judgment flag" indicates "0", the output control 224 judges that the image information cannot be outputted. Since "judgment flag" of the record for managing the image information "movie 01" is "1", the output control unit 224 judges that the image information can be outputted. Then, the output control unit 224 causes the output unit 221 to read, from the image information storage unit 205, the image information "movie 01" associated with the listed item specified in the item instruction, and causes the display 40 to output the read-out image information "movie 01".

Here, it is assumed that the user holding the information terminal 10b enters the room in which the image output apparatus 22 is placed.

Then, it is assumed that the user holding the information terminal 10a or 10b has transmitted an output instruction to instruct on the output of the list to the image output apparatus 22 through infrared communication.

When the output instruction receiving unit 207 of the image output apparatus 22 has received an output instruction from the information terminal 10a, the request signal transmission unit 206 transmits a request signal.

The information terminal 10a, having received the request signal, transmits the identification information "100112" stored in the identification information storage unit 101, according to the request signal. The information terminal 10a, having received the request signal, transmits the identification information "184118" stored in the identification information storage unit 101, according to the request signal.

The image output apparatus 22, having received plural (here, two) pieces of identification information transmitted by the information terminals 10a and 10b; therefore, the condition information obtainment unit 208 obtains the condition information associated with each piece of image information which can be outputted by the output unit 221, that is, an attribute value of "condition information" shown in FIG. 16 in this case. Then, the judgment unit 223 judges whether or not the plural identification information received by the identification information receiving unit 202 satisfy a predetermined condition set in the obtained condition information.

The identification information management table for managing the identification information of the information terminals 10a and 10b is as same as the one shown in FIG. 6.

The judgment unit 223 sets a predetermined condition defined as "viewing condition" associated with the identification information includes a condition specified in the condition information of the image information obtained by the condition information obtainment unit 208", and judges whether or not all the identification information received by the identification information receiving unit 202 satisfy the predetermined condition.

Figure 18:
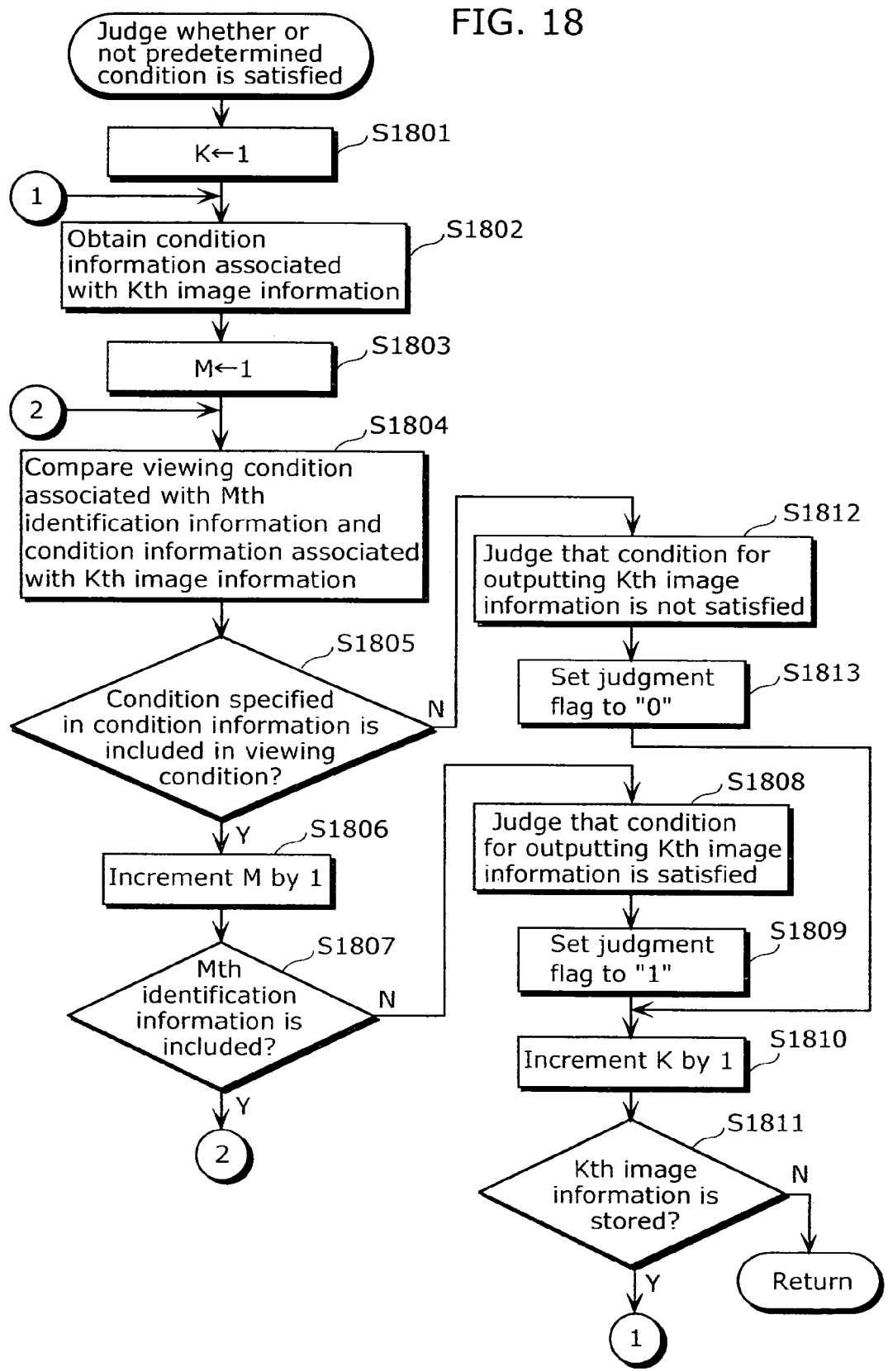
FIG. 18 is a flowchart showing the operation of the judgment process according to the third embodiment.

The following describes the processing of the condition information obtainment unit 208 and the judgment unit 223 using the flowchart shown in FIG. 18. The processing is equivalent to the process in Step S1507 shown in FIG. 15.

(Step S1801) The condition information obtainment unit 208 substitutes "1" into a counter K.

(Step S1802) The condition information obtainment unit 208 obtains the condition information associated with the Kth image information, out of the image information stored in the image information storage unit 205, from the image information management table shown in FIG. 16.

(Step S1803) The judgment unit 223 substitutes "1" into the counter K.

(Step S1804) The judgment unit 223 compares the viewing condition associated with the Mth identification information out of the identification information received by the identification information receiving unit 202, and the condition information associated with the Kth image information obtained in Step S1801, based on the identification information management table shown in FIG. 6.

(Step S1805) As a result of the comparison made in Step S1804, the judgment unit 223 judges whether or not the condition specified in the condition information obtained in Step S1802 is included in the viewing condition of the Mth identification information. In the case where the condition is included, the process moves to Step S1806, and in the case where the condition is not included, the process moves to Step S1812.

(Step S1806) The judgment unit 223 increments a counter M by "1".

(Step S1807) The judgment unit 223 judges whether or not the Mth identification information is included in the identification information received by the identification information receiving unit 202. In the case it is included, the process returns back to Step S1804, and in the case it is not, the process moves to Step S1808.

(Step S1808) The judgment unit 223 judges that the plural pieces of identification information received by the identification information receiving unit 202 satisfy the condition for outputting the Kth image information.

(Step S1809) The judgment unit 223 sets "judgment flag" of the record associated with the Kth image information in the image information management table to "1".

(Step S1810) The judgment unit 223 increments the counter K by "1".

(Step S1811) The judgment unit 223 judges whether or not the Kth image information is stored in the image information storage unit 205. In the case where it is stored, the process returns back to Step S1801, and in the case where it is not, the process returns to the upper function.

(Step S1812) The judgment unit 223 judges that the plural pieces of identification information received by the identification information receiving unit 202 do not satisfy the condition for outputting the Kth image information.

(Step S1813) The judgment unit 223 sets "judgment flag", in the image information management table, of the record associated with the Kth image information to "0". Then, the process moves to Step S1810.

The following describes in detail the processing of the judgment unit 223. First, the judgment unit 223 obtains an attribute value "TV-14", in the image information management table shown in FIG. 16, of "condition information" of the record with "ID" indicating "001". Then, the judgment unit 223 judges whether or not the viewing condition, in the identification information management table shown in FIG. 6, associated with the identification information received by the identification information receiving unit 202 and the viewing condition associated with the identification information "184118" respectively include the condition which matches the attribute value "TV-14" of "condition information". In the case where the both viewing conditions include such a condition, "judgment flag" of the record with "ID" indicating "001" in the image information management table shown in FIG. 16 is set to "1", while in the case where either of the viewing conditions does not include such a condition, "judgment flag" of the record with "ID" indicating "001" is set to "0". After repeating this process until reaching the image information with "ID" indicating "005" in the image information management table shown in FIG. 16, the image information management table is completed as shown in FIG. 19.

The output control unit 224 controls the output unit 221 so that the output unit 221 obtains the listed item information associated with the image information stored in the image information storage unit 205. The listed item information here is made up of thumbnail images of each piece of image information and the names of the image information. The output control unit 224 controls, based on the image information management table shown in FIG. 19 obtained through the judgment by the judgment unit 223, the output unit 221 to output, for the image information with "judgment flag" indicating "1", the thumbnail image with the transparency of 0% and the name of the image information, and outputs, for the thumbnail image with "judgment flag" indicating "0", the thumbnail image with the transparency of 80% which allows the background to be visible and the name of the image information. An example of the output is shown in FIG. 20.

Next, it is assumed that the user has operated a key of the information terminal 10a or the information terminal 10b, or the like, and transmitted an item instruction to select the listed item associated with the image information "movie 01" through infrared communication.

Figures 19, 20:
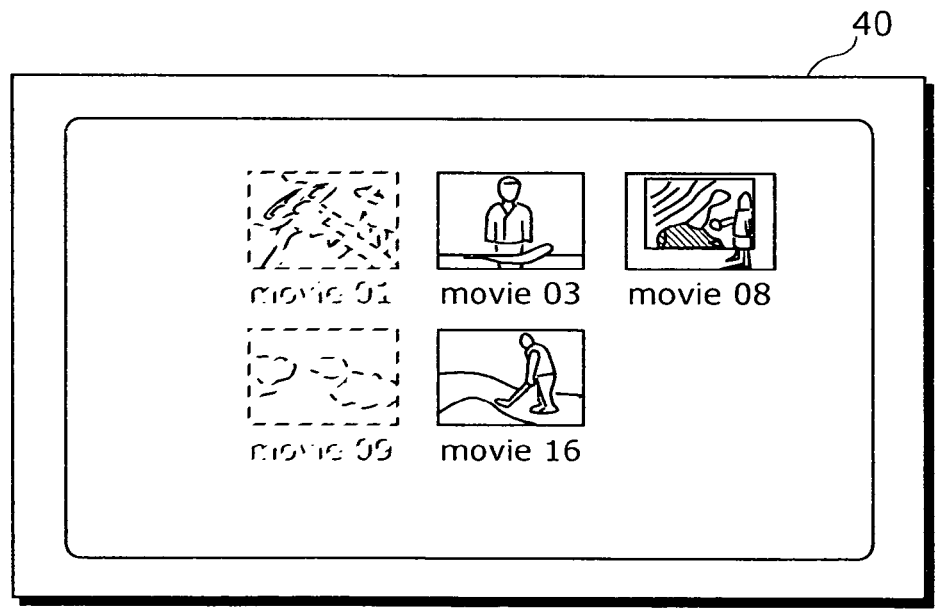
FIG. 19 is a diagram showing the image information management table according to the third embodiment.
FIG. 20 is a diagram showing an output example according to the third embodiment.

When the item instruction receiving unit 228 of the image output apparatus 22 receives an item instruction to select the listed item associated with "movie 01", from the information terminal 10a or the information terminal 10b, the output control unit 224 judges whether or not "judgment flag", in the image information management table shown in FIG. 19, of the record for managing the image information "movie 01" associated with the selected listed item indicates "1". In the case where "judgment flag" indicates "1", the output control unit 224 judges that the image information associated with the listed item can be outputted, and in the case where "judgment flag" indicates "0", the output control unit 224 judges that the image information cannot be outputted. Here, since "judgment flag" of the record for managing the image information "movie 01" indicates "0", the output control unit 224 judges that the image information cannot be outputted and does not output the image information "movie 01".

Next, it is assumed that the user has operated a key of the information terminal 10a or the information terminal 10b, or the like, and transmitted an item instruction to select the listed item associated with the image information "movie 08" through infrared communication.

When the item instruction receiving unit 228 of the image output apparatus 22 receives the item instruction to select the listed item associated with "movie 08", from the information terminal 10a or the information terminal 10b, the output control unit 224 judges whether or not "judgment flag", in the image information management table shown in FIG. 19, of the record for managing the image information "movie 08" associated with the selected listed item indicates "1". Here, "judgment flag" of the record for managing the image information "movie 08" indicates "1"; therefore, the output control unit 224 causes the output unit 221 to read out, from the image information storage unit 205, the image information "movie 08" associated with the listed item specified in the item instruction. Then, the output control unit 224 causes the display 40 to display the read-out image information "movie 08" after the display of the list.

Note that the output control unit 224 may control the output unit 221 so that the listed item information associated with the image information with "judgment flag" indicating "0" is not obtained, and the listed item associated with the image information with "judgment flag" indicating "0" is not displayed in the list.

According to the embodiment as described above, a list including the listed items associated with the plural pieces of image information is outputted, and whether or not plural pieces of identification information satisfy a condition for outputting each piece of image information is judged. In addition, it is possible to thoroughly limit the output of the image information for plural users by outputting the listed item associated with the image information which satisfies the condition and the listed item which does not satisfy the condition in different manners based on the judgment. It is also possible to allow the user to intuitively distinguish the image information whose output is permitted and the image information whose output is not permitted in the list for selecting image information. Moreover, it is possible to prevent the output of the image whose viewing is not allowed due to operation error or the like, since the image information whose output is not allowed in the list is not outputted even its listed item is selected.

Needless to say, the configuration of the image output system according to the embodiment may be combined with the configuration of the first and/or second embodiment.

The judgment unit 223 may perform the judgment as shown in FIG. 13 in the second embodiment instead of the judgment process shown in FIG. 18. More precisely, such a modification is possible if the processes performed in Steps S1804 and 1805 in FIG. 18 are replaced with the processes performed in Steps 1304 and 1305, and information such as "minimum age" is provided when necessary.

Fourth Embodiment

The image output system according to the fourth embodiment applies the system described in the first embodiment and includes an information processing apparatus for judging whether or not plural pieces of identification information satisfy a predetermined condition.

Figure 21:
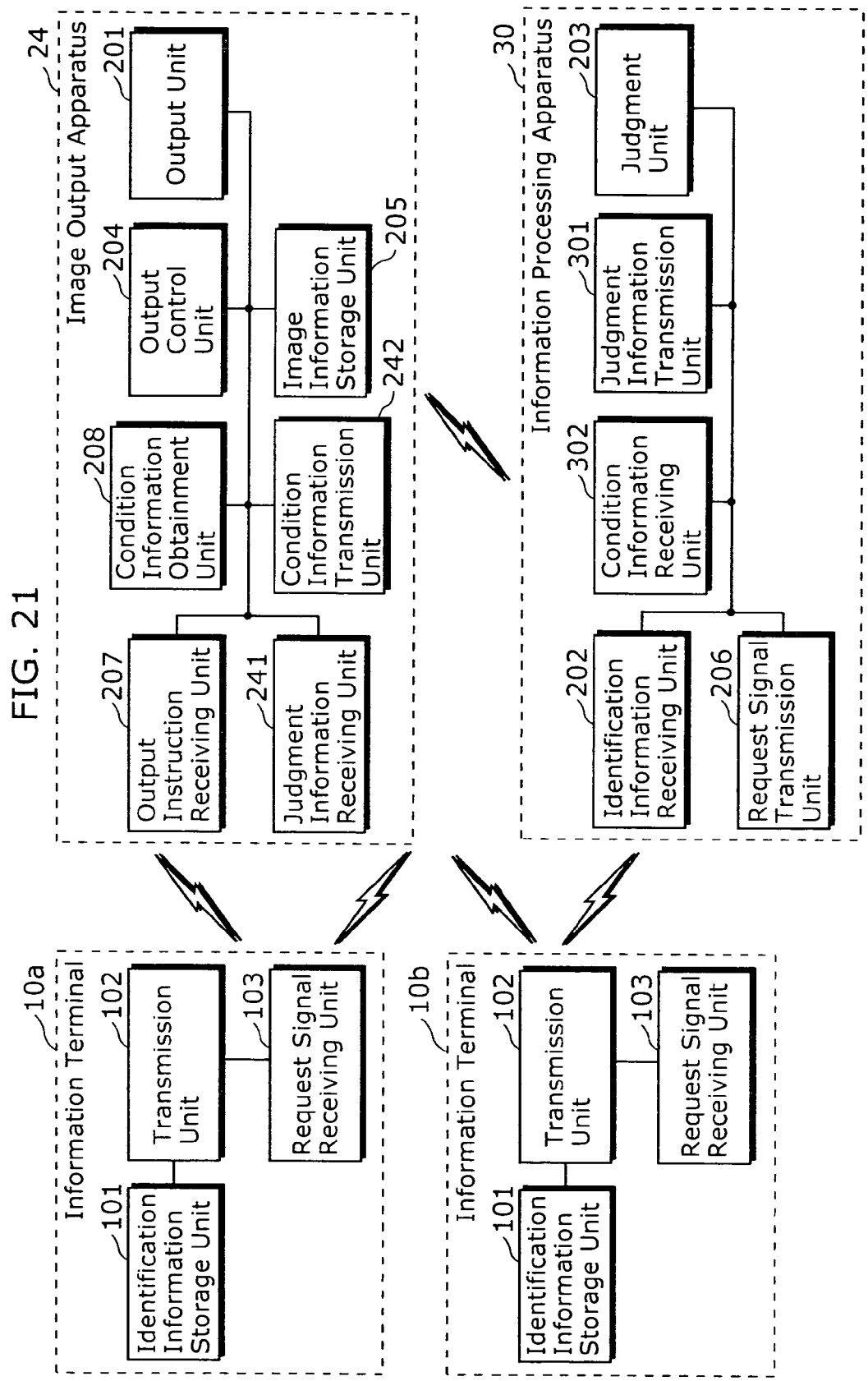
FIG. 21 is a block diagram showing the image output system according to a fourth embodiment.

FIG. 21 is a block diagram showing the configuration of the image output system according to the fourth embodiment.

The image output system includes the information terminals 10a and 10b, an image output apparatus 24 and an information processing apparatus 30. Note that the embodiment describes the case of using two information terminals. The present invention, however, is also applicable to the case of using plural information terminals having the same configuration as that of the information terminals 10a and 10b.

Since the configuration of the information terminals 10a and 10b are as same as the one described in the first embodiment, the description shall be omitted. However, the information terminal 10a and the information terminal 10b shall be capable of transmitting and receiving the information such as identification information to and from the information processing apparatus 30.

The image output apparatus 24 includes the output unit 201, the output control unit 204, the image information storage unit 205, the output instruction receiving unit 207, the output instruction receiving unit 207, the condition information obtainment unit 208, a judgment information receiving unit 241, and a condition information transmission unit 242. The configurations of the output unit 201, the output control unit 204, the image information storage unit 205, the output instruction receiving unit 207, and the condition information obtainment unit 208 are as same as those described in the first embodiment, and the descriptions shall be omitted. Note that the output control unit 204 controls the output of the output unit 201 based on the judgment of the judgment unit 203 obtained based on the judgment information which will be mentioned later.

The judgment information receiving unit 241 receives, from the information processing apparatus 30, the judgment information to be mentioned later. The judgment information receiving unit 241 is normally realized with a wireless or wired communication unit, but may be realized with a broadcast receiving unit.

The information processing apparatus 30 includes the identification information receiving unit 202, the judgment unit 203, the request signal transmission unit 206, a judgment information transmission unit 301 and a condition information receiving unit 302. The configurations of the identification information receiving unit 202, the judgment unit 203, and the request signal transmission unit 206 are as same as those in the embodiments described above, and the descriptions shall be omitted.

The judgment information transmission unit 301 transmits the information indicating the judgment made by the judgment unit 203. To be concrete, the judgment information transmission unit 301 creates the judgment information which is information indicating the judgment of the judgment unit 203. Then, the judgment information transmission unit 301 transmits the created judgment information to the image output apparatus 24. The judgment information may be created by the judgment unit 203. The judgment information may be, for instance, information indicating "a predetermined condition is not satisfied" or "a predetermined condition is satisfied". The information such that indicates "0" in the case where a predetermined condition is not satisfied, and indicates "1" in the case where a predetermined condition is satisfied may be used as the judgment information. The judgment information transmission unit 301 is normally realized with a wireless or wired communication unit, but may be realized with a broadcasting unit. An MPU or a memory for creating judgment information may be equipped in the judgment information transmission unit 301.

The condition information receiving unit 302 receives the condition information transmitted from the condition information transmission unit 242. The condition information receiving unit 302 is normally realized with a wireless or wired communication unit, but may be realized with a broadcasting unit.

Next, the configuration of the image output system according to the embodiment will be described.

Since the operation of the information terminals 10a and 10b are as same as the one described in the first embodiment, the description will be omitted.

Figure 22:
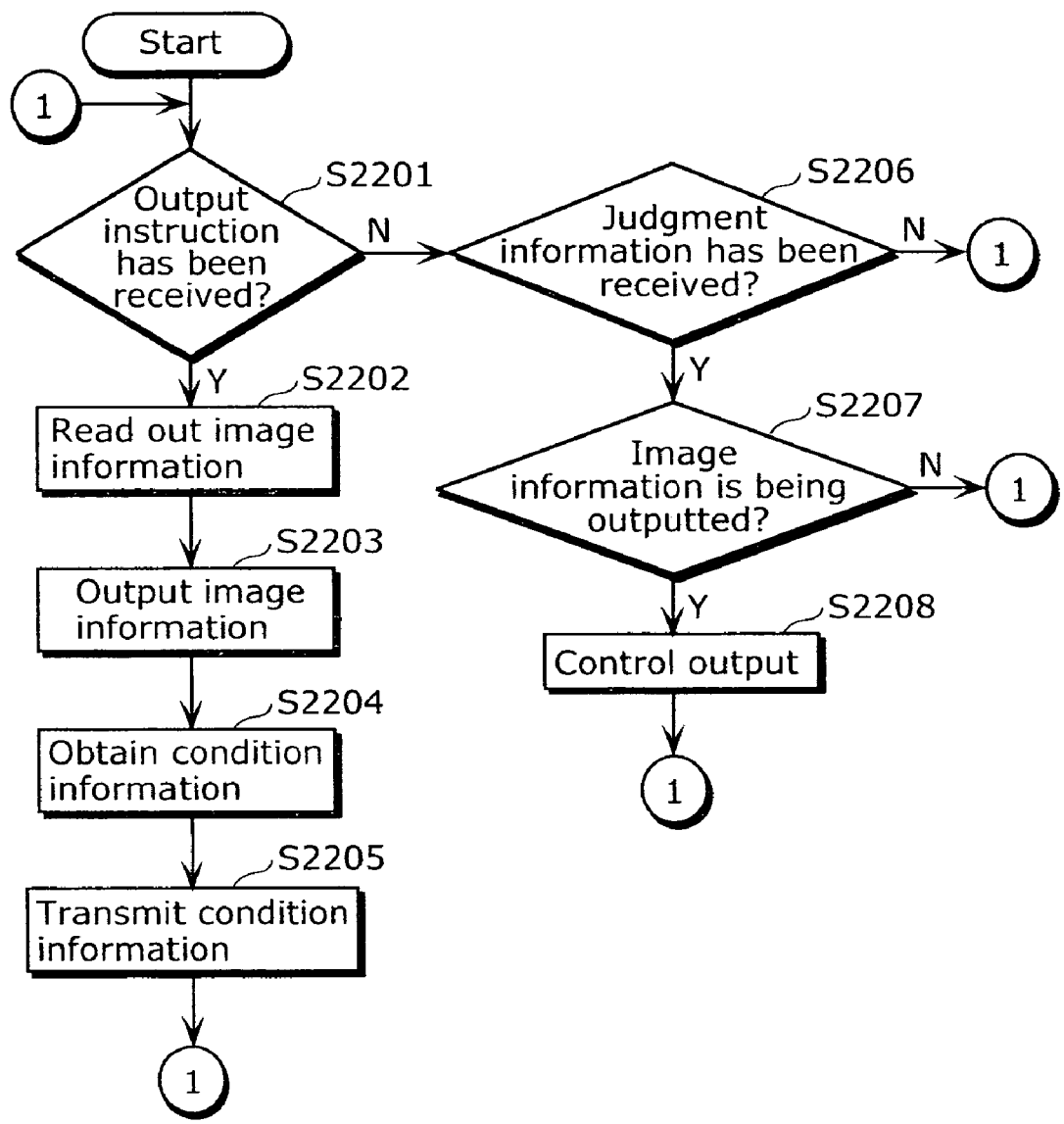
FIG. 22 is a flowchart illustrating the operation of the image output apparatus according to the fourth embodiment.

The operation of the image output apparatus 24 will be described using the flowchart shown in FIG. 22.

(Step S2201) The output instruction receiving unit 207 judges whether or not an output instruction has been received. In the case where the output instruction has been received, the process moves to Step S2202, and in the case where the output instruction has not been received, the process moves to Step S2206. Note that, in Step S2201 just after the power is turned on, the image information which is stored in a memory or the like and has been displayed when the power is turned off or an output instruction which outputs the default image information may be received instead.

(Step S2202) The output unit 201 reads out, from the image information storage unit 205, the image information associated with the output instruction received in Step S2201.

(Step S2203) The output unit 201 outputs the image information that is read out in Step S2202.

(Step S2204) The condition information obtainment unit 208 obtains the condition information associated with the image information specified in the output instruction received in Step S2201.

(Step S2205) The condition information transmission unit 242 outputs the condition information obtained in Step S2204 to the information processing apparatus 30. Then, the process returns back to Step S2201.

(Step S2206) The judgment information receiving unit 241 judges whether or not judgment information has been received. In the case where the judgment information has been received, the process moves to Step S2207, and in the case where it has not been received, the process returns back to Step S2201.

(Step S2207) The output control unit 204 judges whether or not image information is outputted from the output unit 201. In the case where the image information is outputted, the process moves to Step S2208, and in the case where it is not outputted, the process returns back to Step S2201.

(Step S2208) The output control unit 204 controls the output of the output unit 201 based on the judgment indicated by the judgment information received in Step S2206. The control performed by the output control unit 204 is, for example, control for switching the image information. The kind of control performed by the output control unit 204 may be previously set in a memory or the like. The information for setting the kind of control to be performed by the output control unit 204 may be previously added to the image information being outputted by the output unit 201, so that the output control unit 204 reads this out and controls the output unit 201 according to the information. The output control unit 204 may not change the output depending on the result of the judgment. Then, the process returns to Step S2201.

Please note that the process terminates by the interruption caused by the fact the power is turned off or the process is terminated The operation of the information processing apparatus 30 will be described using the flowchart shown in FIG. 23.

Figure 23:
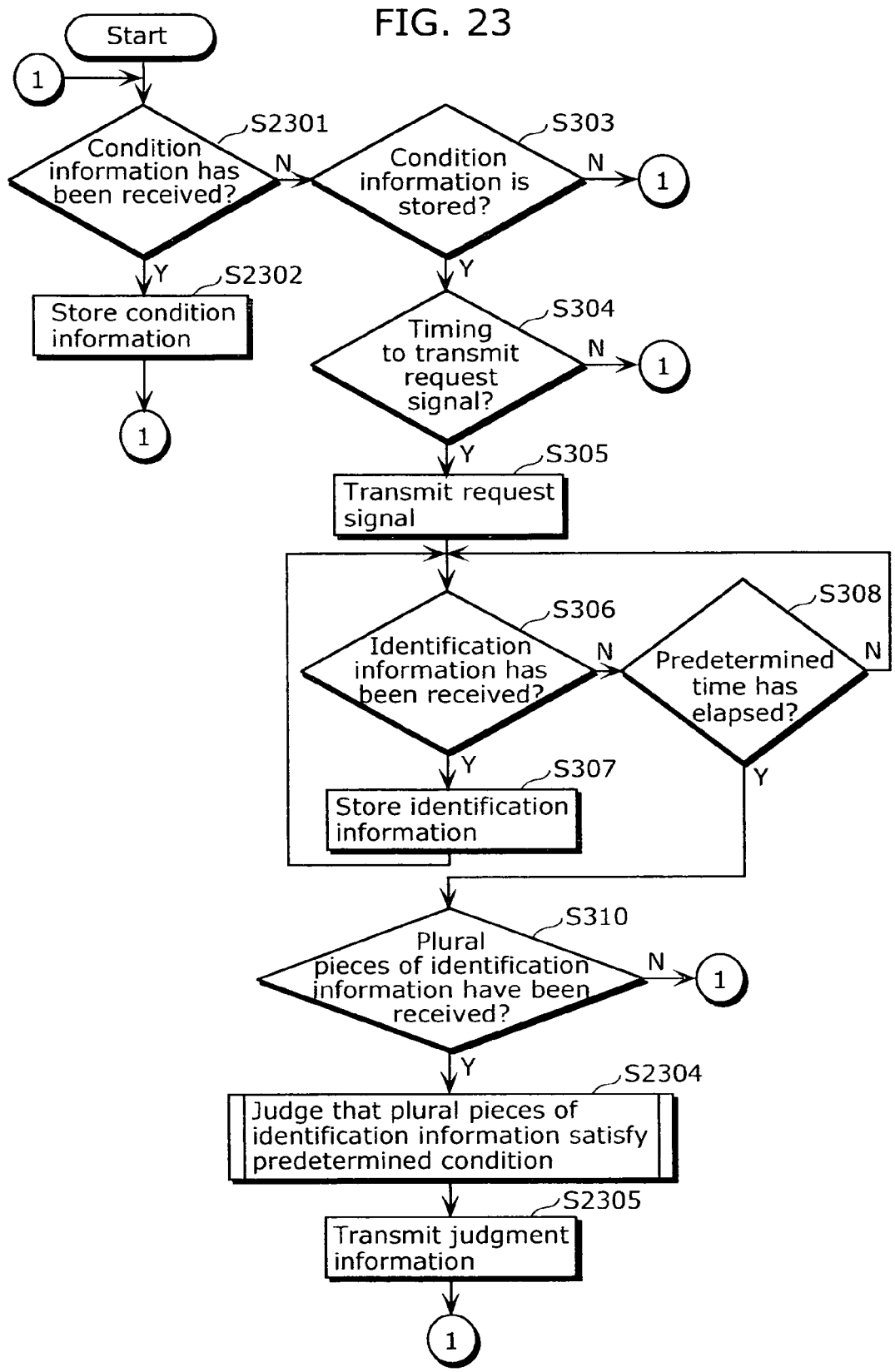
FIG. 23 is a flowchart illustrating the operation of the information processing apparatus according to the fourth embodiment.

Note that, in FIG. 23, the same references as used in FIG. 3 indicate the same or corresponding steps.

(Step S2301) The condition information receiving unit 302 judges whether or not condition information has been received. In the case where the condition information has been received, the process moves to Step S2302, and in the case where it has not been received, the process moves to Step S2303. Note that in the case where predetermined condition information is previously stored in a memory or the like, this step may be omitted.

(Step S2302) The condition information receiving unit 302 stores the condition information received in Step S2301 in a storage medium such as a memory not shown in the diagram.

(Step S2303) The judgment unit 203 judges whether or not the condition information is stored in a memory or the like. In the case where the condition information is stored, the process moves to Step S304, and in the case where it is not stored, the process returns back to Step S2301.

(Step S2304) The judgment unit 203 performs judgment whether or not the plural pieces of identification information stored in Step S307 satisfy the predetermined condition which is set in the condition information stored in a memory or the like. A concrete example of this process is as same as the process described using the flowchart shown in FIG. 7.

(Step S2305) The judgment information transmission unit 301 creates the judgment information based on the judgment of the judgment unit 203, and transmits the created judgment information to the image output apparatus 24. Then, the process returns back to Step S2301.

Figure 24:
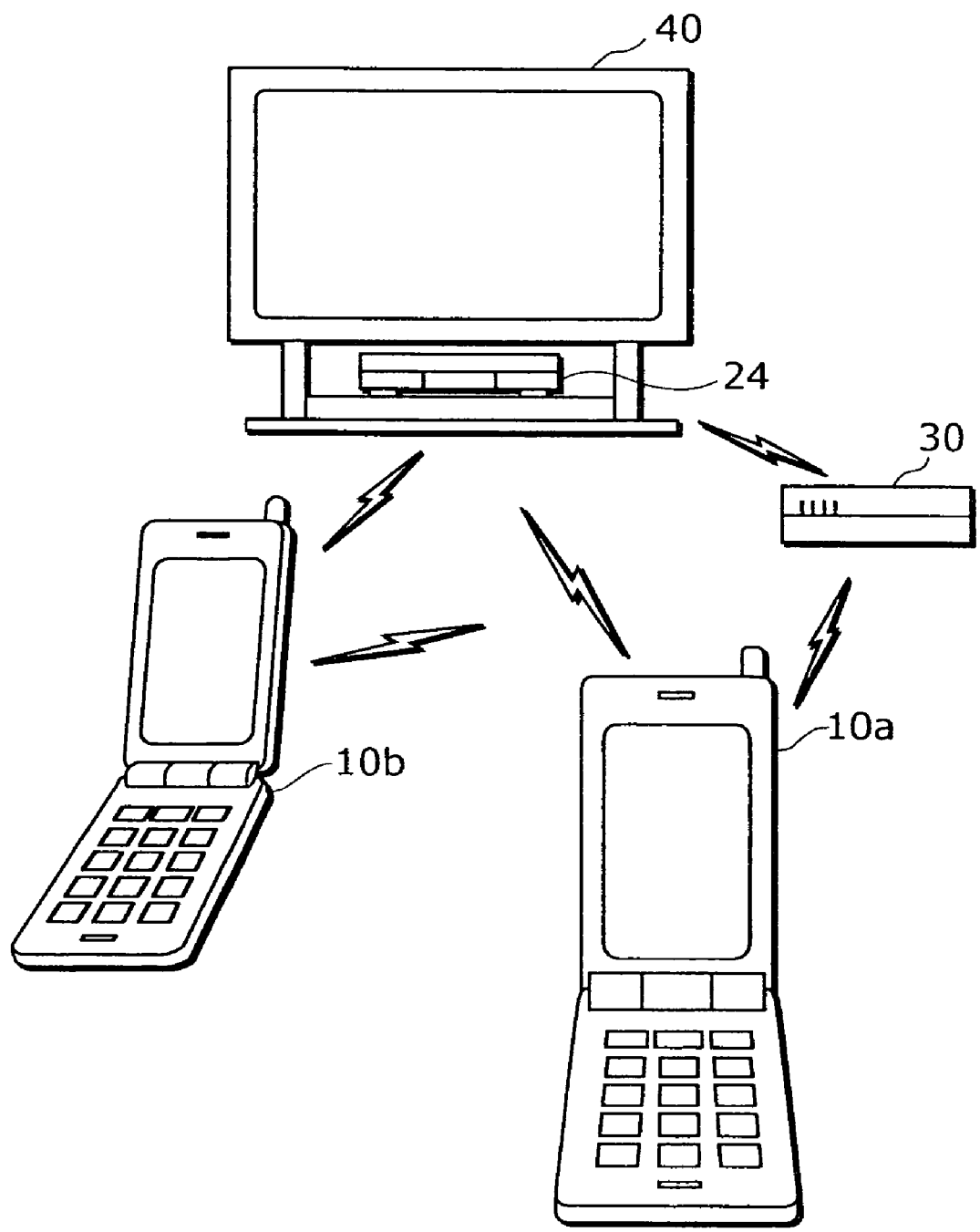
FIG. 24 is a conceptual diagram showing the image output system according to the fourth embodiment.

Note that, in the flowchart shown in FIG. 23, the process terminates by the interruption caused by the fact the power is turned off or the process is terminated The following describes the detailed operation of the image output system according to the embodiment. FIG. 24 is a conceptual diagram showing the image output system. Note that FIG. 24 includes the output image apparatus 24 instead of the image output apparatus 20, and is further equipped with the information processing apparatus 30. Note that the transmissions of request signal, identification information and condition information between apparatuses, or the like, shall be performed wirelessly using electric waves.

It is assumed that the identification information storage unit 101 of the information terminal 10a stores the identification information "100112" while the identification information storage unit 101 of the information terminal 10b stores the identification information "184118", respectively.

Figure 25:
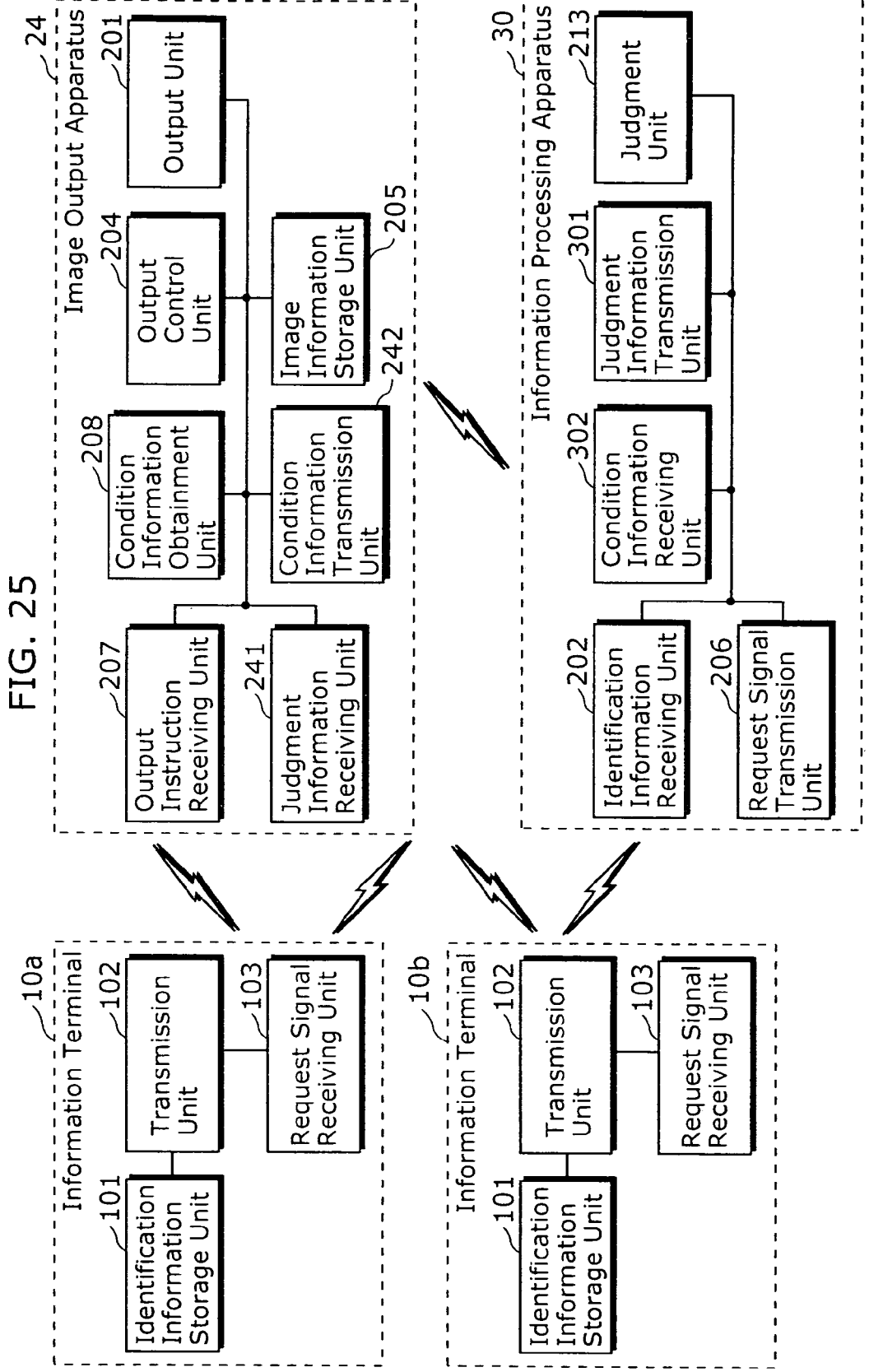
FIG. 25 is a diagram showing variation according to the fourth embodiment.

FIG. 25 is a block diagram showing the configuration of the image output system according to the fourth embodiment. In the embodiment, the image information management table for managing the image information stored in the image information storage unit 205 of the image output apparatus 24 is as same as the one shown in FIG. 5.

Firstly, only the user holding the information terminal 10a is in the room in which the image output apparatus 24 and the information processing apparatus 30 are placed.

It is assumed that the user holding the information terminal 10a has turned on the power of the image output apparatus 24, pressed a key of the information terminal 10a or the like, and transmitted an output instruction for instructing on the output of the image information "movie 03" shown in FIG. 5, through infrared communication.

When the output instruction receiving unit 207 of the image output apparatus 24 receives the output instruction from the information terminal 10*a*, the output unit 201 reads out the image information "movie 03" from the image information storage unit 205, and outputs the read-out image information. On the display 40, images based on the image information "movie 03" are displayed. In the image information management table shown in FIG. 5, the attribute "reproduction flag" of the record which includes the attribute value "movie 03" is set to "1".

Then, the condition information obtainment unit 208 obtains the image information which is currently being outputted, or in other words, the attribute value "TV-14", in the image information management table shown in FIG. 5, of "condition information" of the record with the attribute value of "reproduction flag" indicating "1". Then, the condition information transmission unit 242 outputs the obtained condition information "TV-14" to the information processing apparatus 30.

The condition information receiving unit 302 of the information processing apparatus 30 receives the condition information transmitted from the condition information transmission unit 242, and stores it in a storage medium such as a memory (not shown in the diagram). Note that in the case where other condition information is already stored, the condition information is overwritten by the received condition information.

As an example, the request signal transmission unit 206 is assumed to be set to regularly transmit a request signal. Therefore, in the case where the condition information is stored in a memory or the like, the request signal transmission unit 206 regularly transmits a request signal. Also, it is assumed that the output for transmitting the request signal is adjusted so that the range of receiving the request signal is limited only to the room in which the image output apparatus 30 is placed.

The information terminal 10*a*, having received the request signal, transmits the identification information "100112" stored in the identification information storage unit 101, according to the request signal.

The image output apparatus 30, having received, through the identification information receiving unit 202, the identification information transmitted by the information terminal 10*a*, performs no other processing to the output of the output unit 201 since the only identification information received is the identification information transmitted from the information terminal 10*a*.

Needless to say, judging may be performed using the conventional technology on whether or not to continue the output of the image information which is currently being outputted by the output unit 201, based on the identification information "100112" stored in the identification information storage unit 101 which is uniquely assigned to the user in the room.

Here, it is assumed that the user holding the information terminal 10*b* has entered the room in which the image output apparatus 24 is placed.

Assuming that the request signal transmission unit 206 has transmitted a request signal to be regularly transmitted, the information terminal 10*a* having received the request signal transmits the identification information "100112", as described above. In addition, the information terminal 10*b* having received the request signal transmits the identification information "184118" stored in the identification information storage unit 101, according to the request signal.

The identification information receiving unit 202 receives each piece of identification information transmitted by the information terminals 10*a* and 10*b*. The identification information management table for managing the identification information of the information terminals 10*a* and 10*b* is as same as the one shown in FIG. 6, and shall be stored in a memory or the like within the information processing apparatus 30. The number of the identification information received by the identification information receiving unit 202 is plural (here, two); therefore, the judgment unit 203 judges whether or not all the identification information received by the identification information receiving unit 202 satisfy a predetermined condition which is set in the condition information "TV-14" stored in a memory of the like. More precisely, the judgment unit 203 sets a predetermined condition defined as ""viewing condition" associated with identification information includes a condition specified in the condition information "TV-14" obtained by the condition information obtainment unit 208", and judges whether or not all the identification information received by the identification information receiving unit 202 satisfy the predetermined condition. The judgment process of the judgment unit 203 is as same as the process described using the flowchart shown in FIG. 7.

Here, the judgment unit 203 judges that all the identification information do not satisfy the predetermined condition, since out of the identification information received by the identification information receiving unit 202, the viewing condition associated with the identification information "100112" includes the condition information "TV-14", whereas the viewing condition associated with the identification information "184118" does not include the condition information "TV-14".

The judgment information transmission unit 301 creates the judgment information indicating "a predetermined condition is not satisfied" which shows the result of the judgment made by the judgment unit 203, and transmits the judgment information to the image output apparatus 24.

When the judgment information receiving unit 241 of the image output apparatus 24 receives the judgment information indicating "a predetermined condition is not satisfied", the output control unit 204 performs pre-set control to the output unit 201, based on the judgment information. Here, the output control unit 204 performs, as an example, control for stopping the output of the image information "movie 03" which is currently being outputted.

Here, assuming that the identification information of the information terminal 10*b* is "171344" instead of "184118", The viewing condition associated with the identification information "171344" includes the condition information "TV-14" associated with the image information "movie 03" which is currently being outputted. The judgment unit 203 therefore judges that "a predetermined condition is satisfied" by the identification information. Then, the judgment information transmission unit 301 creates the judgment information indicating "a predetermined condition is satisfied" and transmits the judgment information.

When the judgment information receiving unit 241 of the image output apparatus 24 receives the judgment information indicating "a predetermined condition is satisfied", the output control unit 204 does not change the output of the output unit 201 based on the judgment information of "a predetermined condition is satisfied". Therefore, the output unit 201 continues the output of "movie 03".

According to the embodiment as described above, whether or not plural pieces of identification information received from plural information terminals satisfy a predetermined condition is judged, and the output of the output unit 201 is controlled based on the judgment. It is therefore possible to thoroughly limit, for plural users, the output of the image information.

Also, in the information processing apparatus 30, whether or not the plural pieces of identification information received from the information terminals 10a and 10b satisfy a predetermined condition set in the condition information received from the image output apparatus 24 is judged, the judgment information being information indicating the judgment is transmitted to the image output apparatus 24, and the output of the output unit 201 is controlled, in the image output apparatus 24, based on the judgment information. Therefore, it is possible for the image output system to change or adjust the range of receiving the identification information of the information terminal by changing the placement of the information processing apparatus 30. Thus, it is possible to easily adjust the placement of the image output system or the like, without changing the placement of the image output apparatus 24. Also, it is possible to freely set the position at which the image output apparatus 24 shall be placed, without limiting the range of the reception of the identification information.

Note that, according to the embodiment, instead of equipping, in an image output apparatus, the configuration for judging whether or not plural pieces of identification information satisfy a predetermined condition, an information processing apparatus equipped with the configuration for judging whether or not plural pieces of identification information satisfy a predetermined condition is included in the image output system described in the first embodiment. However, the configuration of equipping the information processing apparatus for judging whether or not plural pieces of identification information satisfy a predetermined condition as shown in the fourth embodiment may be applied to the image output system described in the second and third embodiments.

For example, the configuration in which an information processing apparatus having the configuration for judging whether or not plural pieces of identification information satisfy a predetermined condition is equipped, as in the first embodiment, in the image output system according to the second embodiment is shown in FIG. 25. As shown in the diagram, the judgment unit 203 of the information processing apparatus 300 shown in FIG. 21 is replaced with the judgment unit 213 shown in FIG. 8. Note that the procedures used by the image output apparatus 24 and the image processing apparatus 30 shall be changed as necessary according to the procedure used in the process performed by the image output apparatus 21 of the second embodiment.

Figure 26:
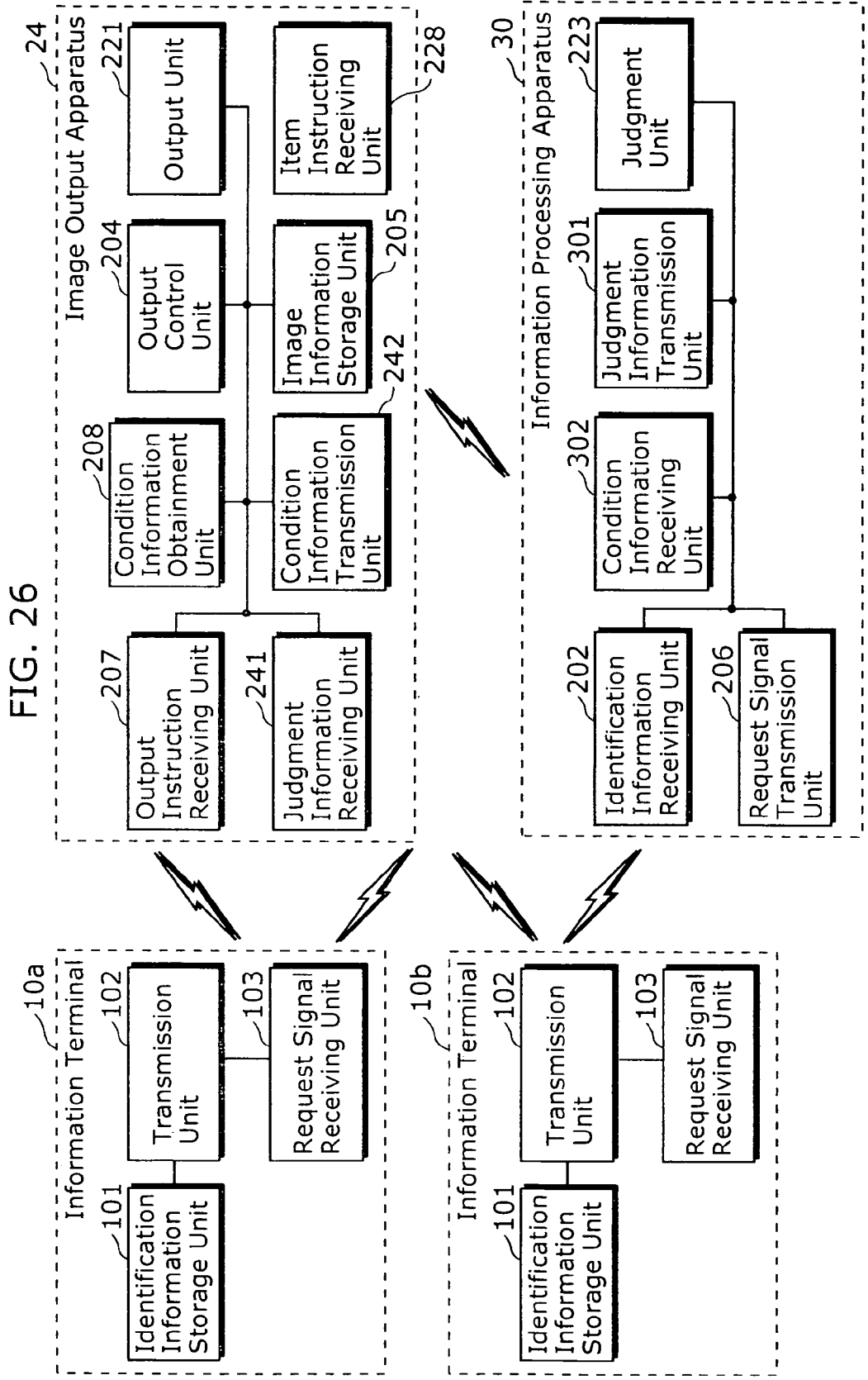
FIG. 26 is a diagram showing another variation according to the fourth embodiment.

The configuration in which an information processing apparatus having the configuration for judging whether or not plural identification information satisfy a predetermined condition is equipped, as in the first embodiment, in the image output system according to the third embodiment is shown in FIG. 26. As shown in the diagram, the output unit 201 and the judgment unit 203 shown in FIG. 21 are respectively replaced with the output unit 221 and the judgment unit 223 shown in FIG. 14. Note that the procedures used by the image output apparatus 24 and the information processing apparatus 30 shall be changed as necessary according to the procedure used in the process performed by the image output apparatus 22 according to the third embodiment.

Note that each process (each function) may be realized by integrated processing executed by a single apparatus (system), or by distributed processing executed by plural apparatuses.

In each of the above-mentioned embodiments, each component may be configured by hardware, or for the components realizable by software may be realized by executing a program. For example, each of the components may be realized by the fact a program execution unit such as a CPU reads out and executes a software program recorded in a storage medium such as a hard disk or a semiconductor memory. Note that the software for realizing the image output apparatus according to the first through third embodiments is the program as indicated below. In other words, this program causes a computer to execute an output step of obtaining image information which is information related to images, and outputting the obtained image information as well as the following steps of: an identification information receiving step of receiving plural pieces of identification information, which is information transmitted from plural information terminals for identifying each of the information terminals; a judging step of judging whether or not plural pieces of identification information received in the identification information receiving step satisfy a predetermined condition; and an output control step of controlling the output step based on the judgment made in the judgment step.

The software for realizing the image output apparatus according to the fourth embodiment is the program as described below. In other words, this program is a program for causing a computer to execute an output step of obtaining image information being information related to images, and outputting the obtained image information as well as the following steps of: an identification information receiving step of receiving plural pieces of identification information, which is information transmitted from plural information terminals for identifying each of the information terminals; a judging step of judging whether or not the plural pieces of identification information received in the identification information receiving step satisfy a predetermined condition; and an output control step of controlling the output step based on the judgment made in the judgment step.

The software for realizing the image output apparatus according to the fourth embodiment is the program as described below. That is to say that this program is a program for causing a computer to execute an output step of obtaining image information which is information related to images, and outputting the obtained image information as well as the following steps of: output step of obtaining image information which is information related to images as well as the following steps of: a judgment information receiving step of receiving judgment information which is information indicating a result of judgment on whether or not identification information which is information for identifying each of the information terminals and is transmitted from plural information terminals; and an output control step of controlling the output step based on the judgment information.

Note that, according to the program, a transmission step of transmitting information and a receiving step of receiving information do not include processing performed by hardware such as the processing performed by a modem or an interface card in the transmission step (processing which can be performed only by hardware).

This program may be executed through the downloading from a server or the like, or by reading out the program recorded in a predetermined storage medium (e.g., an optical disk such as a CD-ROM, a magnetic disk and a semiconductor memory).

The number of computers which execute the program may be single or plural. In other words, either integrated processing or distributed processing may be performed.

Needless to say, two or more communication units (e.g. transmission unit) equipped in one apparatus may be physically realized with one medium.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The image output system according to the present invention is suitable as an image output system which can limit viewing of images, and in particular, as an image output system which limits viewing when plural users view images.

What is claimed is:

1. An image output system comprising information terminals and an image output apparatus,
   each of said information terminals including:
   an identification information storage unit operable to store identification information for identifying each of said information terminals; and
   a transmission unit operable to transmit the identification information to said image output apparatus in response to a request from said image output apparatus, and
   said image output apparatus including:
   an identification information receiving unit operable to receive the identification information transmitted from each of said information terminals in response to the request;
   an output unit operable to obtain image information which is information related to an image, and to output the obtained image information;
   a condition information obtainment unit operable to obtain condition information which is related to a predetermined condition associated with the image information outputted by said output unit;
   a judgment unit operable to judge whether or not all identification information which is transmitted in response to the request and received by said identification information receiving unit satisfies the predetermined condition which is set in the condition information obtained by said condition information obtainment unit; and
   an output control unit operable to control said output unit based on the judgment made by said judgment unit.

2. The image output system according to claim 1,
   wherein said output control unit is operable to control said output unit to switch image information to other image information or to stop the output of the image information, based on the judgment made by said judgment unit, the image information being currently outputted by said output unit.

3. The image output system according to claim 1,
   wherein said image output apparatus further includes an output instruction receiving unit operable to receive information for instructing on the output of the image information, and
   said output control unit is operable to control said output unit to output the image information based on the judgment made by said judgment unit.

4. The image output system according to claim 1,
   wherein said output unit is operable to output the image information to one or more windows, and
   said output control unit is operable to control the windows to which said output unit outputs the image information, based on the judgment made by said judgment unit.

5. The image output system according to claim 1,
   wherein said output unit is operable to output a list made up of one or more listed items, each of which is associated with the image information that can be outputted by said output unit,
   said judgment unit is operable to judge, for each piece of image information that can be outputted by said output unit, whether or not each piece of identification information satisfies the predetermined condition which is a condition for outputting each piece of image information, and
   said output control unit is operable to control said output unit to output a listed item in a manner different from a manner in which a listed item is outputted, the former listed item being associated with the image information to be outputted based on each piece of identification information which is judged as satisfying the predetermined condition, and the latter listed item being associated with other image information.

6. The image output system according to claim 1,
   wherein said output unit is operable to output a list of listed items associated with one or more image information which can be outputted by said output unit,
   said image output apparatus further includes an item instruction receiving unit operable to receive an instruction to select at least one of the listed items,
   said judgment unit is operable to judge, for each piece of image information that can be outputted by said output unit, whether or not the respective identification information satisfies the predetermined condition which is a condition for outputting each piece of image information, and
   only in the case where said item instruction receiving unit has received the instruction to select at least one of the listed items which is associated with the image information to be outputted based on each piece of identification information which is judged as satisfying the predetermined condition as a result of the judgment, said output control unit is operable to control said output unit so that said output unit outputs the image information associated with the selected listed item.

7. The image output system according to claim 1,
   wherein said judgment unit is operable to judge whether or not plural pieces of pre-set identification information match the plural pieces of identification information received by said identification information receiving unit.

8. The image output system according to claim 1,
   wherein said judgment unit is operable to judge whether or not all the pieces of identification information received by said identification information receiving unit satisfy the predetermined condition.

9. An image output apparatus comprising:
   an identification information receiving unit operable to receive identification information respectively transmitted from information terminals, said identification information being transmitted by said information terminals in response to a request from said image output apparatus, said identification information identifying each of the information terminals;
   an output unit operable to obtain image information which is information related to an image, and to output the obtained image information;
   a condition information obtainment unit operable to obtain condition information which is information related to a predetermined condition associated with the image information outputted by said output unit;

a judgment unit operable to judge whether or not all identification information which is transmitted in response to the request and received by said identification information receiving unit satisfies a predetermined condition which is set in the condition information obtained by said condition information obtainment unit; and an output control unit operable to control said output unit based on the judgment made by said judgment unit.

10. An information processing apparatus comprising:

an identification information receiving unit operable to receive identification information respectively transmitted from information terminals, said identification information being transmitted by said information terminals in response to a request from said image output apparatus, the identification information identifying each of said information terminals;

a condition information receiving unit operable to receive condition information which is information related to a predetermined condition associated with image information;

a judgment unit operable to judge whether or not all identification information which is transmitted in response to the request and received by said identification information receiving unit satisfies the predetermined condition set in the condition information received by said condition information receiving unit; and a judgment information transmission unit operable to transmit, to an image output apparatus, judgment information indicating the judgment made by said judgment unit.

11. A computer readable storage medium containing program for use in an image output apparatus, said program causing a computer to execute:

receiving identification information respectively transmitted from information terminals, the identification information being transmitted in response to the request by the information terminals, the identification information identifying each of the information terminals;

obtaining image information which is information related to an image, and outputting the obtained image information;

obtaining condition information related to a predetermined condition associated with the image information outputted in said outputting;

judging whether or not all identification information which is transmitted in response to the request and received in said receiving satisfies a predetermined condition which is set in the condition information obtained in said obtaining; and controlling said outputting based on the judgment resulting from said judging.

* * * * *